US012719070B2

(12) United States Patent
Nakazawa et al.

(10) Patent No.: US 12,719,070 B2
(45) Date of Patent: Aug. 25, 2026

(54) FLUORINE-CONTAINING COMPOUND HAVING SULFONIC ACID GROUP AND POLYMER ELECTROLYTE FUEL CELL

(71) Applicant: NISSAN CHEMICAL CORPORATION, Tokyo (JP)

(72) Inventors: Taichi Nakazawa, Funabashi (JP); Takamasa Kikuchi, Funabashi (JP)

(73) Assignee: NISSAN CHEMICAL CORPORATION, Tokyo (JP)

(*) Notice: Subject to any disclaimer, the term of this patent is extended or adjusted under 35 U.S.C. 154(b) by 511 days.

(21) Appl. No.: 18/285,101

(22) PCT Filed: Mar. 29, 2022

(86) PCT No.: PCT/JP2022/015280

§ 371 (c)(1),
(2) Date: Sep. 29, 2023

(87) PCT Pub. No.: WO2022/210641

PCT Pub. Date: Oct. 6, 2022

(65) Prior Publication Data

US 2024/0213508 A1 Jun. 27, 2024

(30) Foreign Application Priority Data

Mar. 31, 2021 (JP) ................................ 2021-059380

(51) Int. Cl.
*H01M 8/1039* (2016.01)
*C08G 61/10* (2006.01)
(Continued)

(52) U.S. Cl.
CPC .......... *H01M 8/1039* (2013.01); *C08G 61/10* (2013.01); *H01M 4/8605* (2013.01);
(Continued)

(58) Field of Classification Search
CPC ............. H01M 8/1039; H01M 8/1004; H01M 4/8605; H01M 2008/1095; C08G 61/10;
(Continued)

(56) References Cited

U.S. PATENT DOCUMENTS 4,162,947 A * 7/1979 Canaris .................... C25D 3/22 205/314
7,301,002 B1 11/2007 Cornelius et al.
(Continued)

FOREIGN PATENT DOCUMENTS

JP 2007-294408 A 11/2007
JP 2009-295319 A 12/2009
(Continued)

OTHER PUBLICATIONS

Applicant's response dated Feb. 27, 2025, to the EP search report dated Oct. 23, 2024. (Year: 2025).*
(Continued)

*Primary Examiner* — Jennifer Dieterle
(74) *Attorney, Agent, or Firm* — Birch, Stewart, Kolasch & Birch, LLP

(57) ABSTRACT

A compound that has good solubility in a polar solvent and when it is used as an electrolyte in a catalyst layer of a polymer electrolyte fuel cell, the polymer electrolyte fuel cell exhibits good power generation characteristics is dis-
(Continued)

100 closed. The compound has a structure represented by the following general formula (I)

(I)

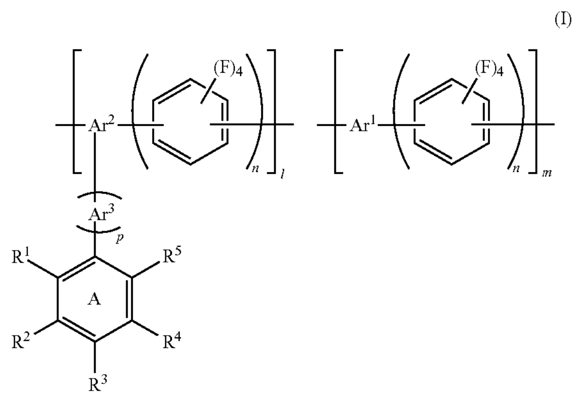

which contains at least one sulfonic acid group.

16 Claims, 1 Drawing Sheet

(51) Int. Cl.
*H01M 4/86* (2006.01)
*H01M 8/1004* (2016.01)
*H01M 8/10* (2016.01)

(52) U.S. Cl.
CPC .... *H01M 8/1004* (2013.01); *C08G 2261/122* (2013.01); *C08G 2261/124* (2013.01); *C08G 2261/148* (2013.01); *C08G 2261/312* (2013.01); *C08G 2261/3142* (2013.01); *C08G 2261/413* (2013.01); *C08G 2261/514* (2013.01); *C08G 2261/722* (2013.01); *H01M 2008/1095* (2013.01)

(58) Field of Classification Search
CPC ........ C08G 2261/122; C08G 2261/124; C08G 2261/148; C08G 2261/312; C08G 2261/3142; C08G 2261/413; C08G 2261/514; C08G 2261/722
See application file for complete search history.

(56) References Cited

U.S. PATENT DOCUMENTS 7,847,035 B2 * 12/2010 Jing .................... H01M 8/1088 525/327.4
9,196,391 B2 * 11/2015 Hasegawa .............. C08G 18/10
2010/0062311 A1 3/2010 Nakagawa et al.
2010/0197815 A1 8/2010 Hoshikawa et al.
2013/0108944 A1 5/2013 Yang et al.
2014/0199604 A1 7/2014 Avataneo et al.
2021/0054138 A1 2/2021 Nakazawa et al.

FOREIGN PATENT DOCUMENTS

JP 2014-522437 A 9/2014
JP 2015-95424 A 5/2015
WO WO 2019/131932 A1 7/2019

OTHER PUBLICATIONS

Bose, "Plancks Gesetz und Lichtquantenhypothese," The European Physical Journal A, vol. 26, No. 1, 1924, pp. 178-181.
Bradley et al., "Evidence of Bose-Einstein Condensation in an Atomic Gas with Attractive Interactions," Physical Review Letters, vol. 75, No. 9, Aug. 28, 1995, pp. 1687-1690.
European Communication pursuant to Article 94(3) EPC for European Application No. 22 780 852.4, dated Nov. 6, 2024.
European Search Report for European Application No. 22780852.4, dated Oct. 23, 2024.
Kuwabara et al., "Synthesis of conjugated polymers via direct C—H/C—Cl coupling reactions using a Pd/Cu binary catalytic system," Polymer Chemistry, vol. 10, 2019, pp. 2298-2304.
Lu et al., "Polycondensation of Dibromofluorene Analogues with Tetrafluorobenzene via Direct Arylation," Macromolecules, vol. 44, 2011, pp. 1252-1255.
Lu et al., "Synthesis of π-Conjugated Polymers Containing Fluorinated Arylene Units via Direct Arylation: Efficient Synthetic Method of Materials for OLEDs," Macromolecules, vol. 45, 2012, pp. 4128-4133.
Nishida et al., "Reactions of Bifunctional Perfluoroarylsilanes with Activated C—F Bonds in Perfluorinated Arenes," ACS Omega, vol. 4, 2019, pp. 20807-20818.
Pankow et al., "Sustainable Synthesis of a Fluorinated Arylene Conjugated Polymer via Cu-Catalyzed Direct Arylation Polymerization (DArP)," ACS Macro Letters, vol. 7, 2018, pp. 1232-1236.
Saito et al., "Facile Synthesis of Fluorene-Based Tr-Conjugated Polymers via Sequential Bromination/Direct Arylation Polycondensation," Journal of Polymer Science, Part A: Polymer Chemistry, vol. 53, 2015, pp. 2198-2201.
Togawa et al., "Direct Arylation Polycondensation of Fluoroarenes with Dibromoarenes," Japanese Journal of Polymer Science and Tech, vol. 76, No. 3, 2019, pp. 261-266, with an English abstract.
Ye et al., "Synthesis of conjugated polymers using arylbromides via Cu-catalyzed direct arylation polymerization (Cu-DArP)," Polymer Chemistry, vol. 10, 2019, pp. 6545-6550.
International Search Report, issued in PCT/JP2022/015280, PCT/ISA/210, dated Jun. 14, 2022.
Written Opinion of the International Searching Authority, issued in PCT/JP2022/015280, PCT/ISA/237, dated Jun. 14, 2022.

* cited by examiner

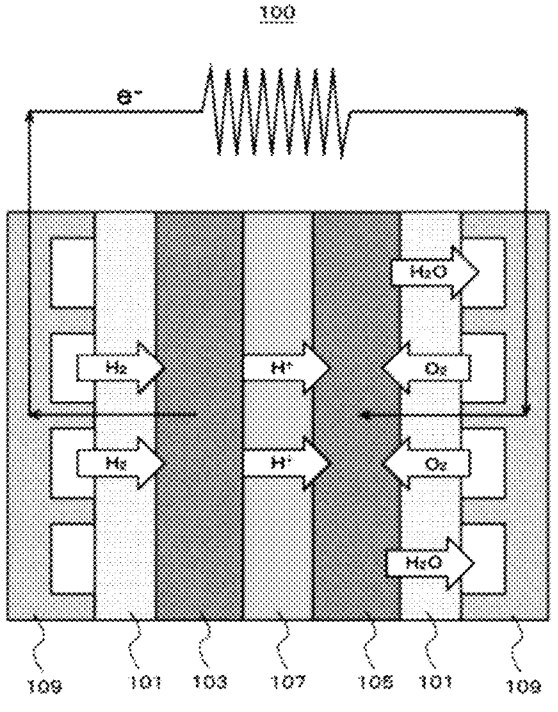
100
e⁻
H₂O
H₂
H⁺
O₂
H₂
H⁺
O₂
H₂O
109
101
103
107
105
101
109

FLUORINE-CONTAINING COMPOUND HAVING SULFONIC ACID GROUP AND POLYMER ELECTROLYTE FUEL CELL

TECHNICAL FIELD

The present invention relates to a fluorine-containing compound having a sulfonic acid group and a polymer electrolyte fuel cell using the compound.

BACKGROUND ART

A polymer electrolyte fuel cell (PEFC) has an anode catalyst layer, a cathode catalyst layer and a polymer electrolyte membrane sandwiched between the both catalyst layers.

For the electrolyte used in the polymer electrolyte membrane, proton conductivity, gas barrier property, electron insulating property and durability are required. As an electrolyte satisfying such characteristics, a fluorine-based ionomer has been used.

As an electrolyte used in a polymer electrolyte membrane and a catalyst layer, a hydrocarbon-based ionomer having an aromatic as a skeleton and a sulfone group is introduced into the skeleton has been known (for example, see Patent Document 1 and Patent Document 2).

As a composition used for the polymer electrolyte membrane, a composition containing a fluorinated polymer having a sulfone group and a fluorinated aromatic compound having a functional group which is reactive with the sulfone group of the fluorinated polymer has been known (for example, see Patent Document 3).

PRIOR ART DOCUMENTS

Patent Documents

Patent Document 1: U.S. Pat. No. 7,301,002
Patent Document 2: JP 2015-95424A
Patent Document 3: JP 2014-522437A

SUMMARY OF THE INVENTION

Problems to Be Solved by the Invention

A catalyst layer is produced by coating a catalyst composition in which a catalyst, catalyst carrier and electrolyte are dispersed or dissolved in a solvent to a polymer electrolyte membrane and a substrate, etc. As a solvent, a polar solvent such as an alcohol, water, etc., is usually used. On the other hand, for the electrolyte of the catalyst layer, in addition to proton conductivity, gas permeability is required as well as electron conductivity. Therefore, when the electrolyte covers at least part of the catalyst carried on a catalyst carrier, these characteristics are likely to be exhibited, and the polymer electrolyte fuel cell can obtain good power generation characteristics. For this purpose, in the catalyst composition, it is desirable that at least part of the electrolyte is dissolved in a solvent, and that a ratio to be dissolved is high.

However, in the composition of Patent Document 3, its use is a solid electrolyte, so that there was no technical task to cover the catalyst, and a solubility of the compound in which the fluorinated polymer and the reactive fluorinated aromatic compound are reacted in a solvent has not been investigated.

An object of the present invention is to provide a compound that has good solubility in a polar solvent and when it is used as an electrolyte in a catalyst layer of a polymer electrolyte fuel cell, the polymer electrolyte fuel cell exhibits good power generation characteristics.

Means to Solve the Problems

The present invention relates to, for example, the following [1] to [13].

[1] A compound having a structure represented by the following general formula (I).

[Formula 1]

(I)

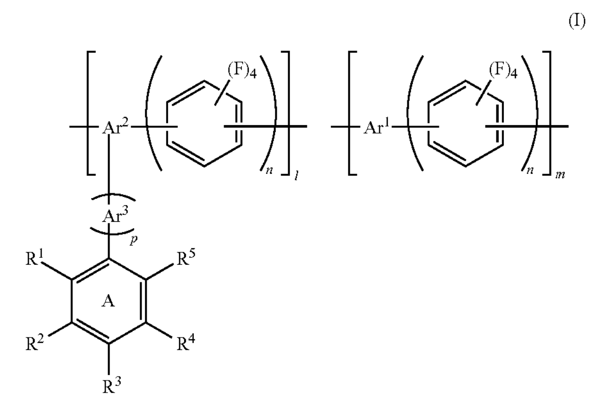

(in the general formula (I), $Ar^1$ is an aromatic structure optionally substituted by a sulfonic acid group(s), $Ar^2$ is an aromatic structure optionally substituted by a sulfonic acid group(s), $Ar^3$ is an aromatic structure optionally substituted by a sulfonic acid group(s), provided that when p=1, $Ar^2$ is a benzene ring optionally substituted by a sulfonic acid group(s), $R^1$ to $R^5$ are each independently hydrogen, a sulfonic acid group or an aromatic group, and the aromatic groups are each independently and optionally substituted by a sulfonic acid group(s), one of $R^1$ to $R^5$ is hydrogen or a sulfonic acid group, and four are aromatic groups, one or more of the groups selected from the group consisting of $Ar^1$, $Ar^2$, and $Ar^3$, $R^1$, $R^2$, $R^3$, $R^4$ and $R^5$, when they are aromatic groups, and benzene ring A has one or more sulfonic acid groups, l and m are molar fractions when l+m=1.0, where $0<l\leq 1.0$ and $0\leq m<1.0$, and when m is not 0, each constitutional unit is randomly copolymerized, "n"s are each independently an integer of 1 to 3, and p is 0 or 1.)

[2] A compound which is obtained by reacting a compound represented by the following general formula (pre-I):

[Formula 2]

(pre-I)

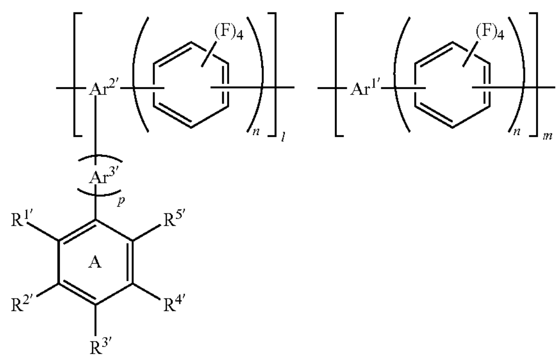

(in the general formula (pre-I), $Ar^{1'}$ is an aromatic structure, $Ar^{2'}$ is an aromatic structure, $Ar^{3'}$ is an aromatic structure, provided that when p=1, $Ar^{2'}$ is a benzene ring, $R^{1'}$ to $R^{5'}$ are each independently hydrogen or an aromatic group, one of $R^{1'}$ to $R^{5'}$ is hydrogen, and four are aromatic groups, l and m are molar fractions when l+m=1.0, where $0<l\leq 1.0$ and $0\leq m<1.0$, and when m is not 0, each constitutional unit is randomly copolymerized, "n"s are each independently an integer of 1 to 3, and p is 0 or 1.)

with a sulfonating agent.

[3] The compound of [1], wherein, in the general formula (I), $Ar^1$ is one kind selected from the group consisting of

[Formula 3]

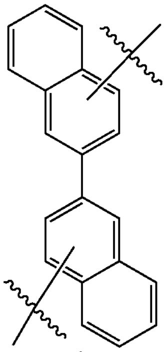,

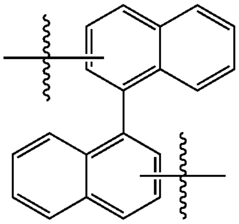,

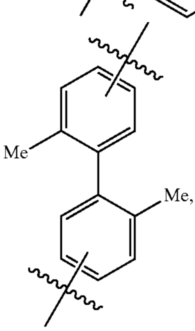

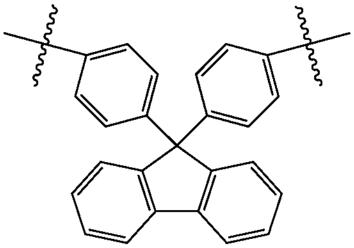,

-continued

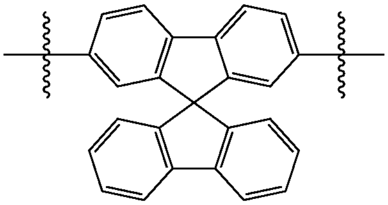,

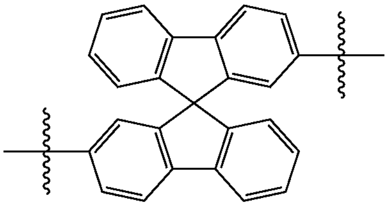,

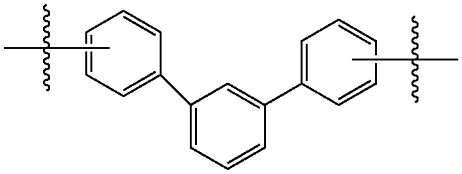,

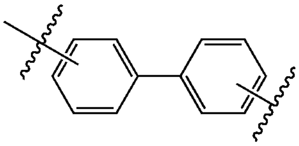, 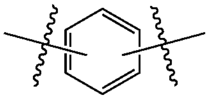 and

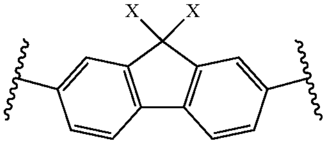

(provided that Xs are each independently hydrogen, an alkyl group having 1 to 8 carbon atoms or a phenyl group) and optionally substituted by a sulfonic acid group(s).

[4] The compound of [1], wherein, in the general formula (I), $R^1$ to $R^5$ when they are aromatics, are each independently one kind selected from the group consisting of

[Formula 4]

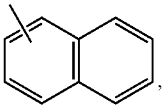, 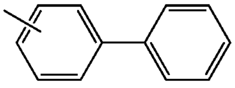 and

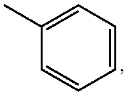, and optionally substituted by a sulfonic acid group(s).

[5] The compound of [2], wherein, in the general formula (pre-I), $Ar^{1'}$ is one kind selected from the group consisting of

[Formula 5]

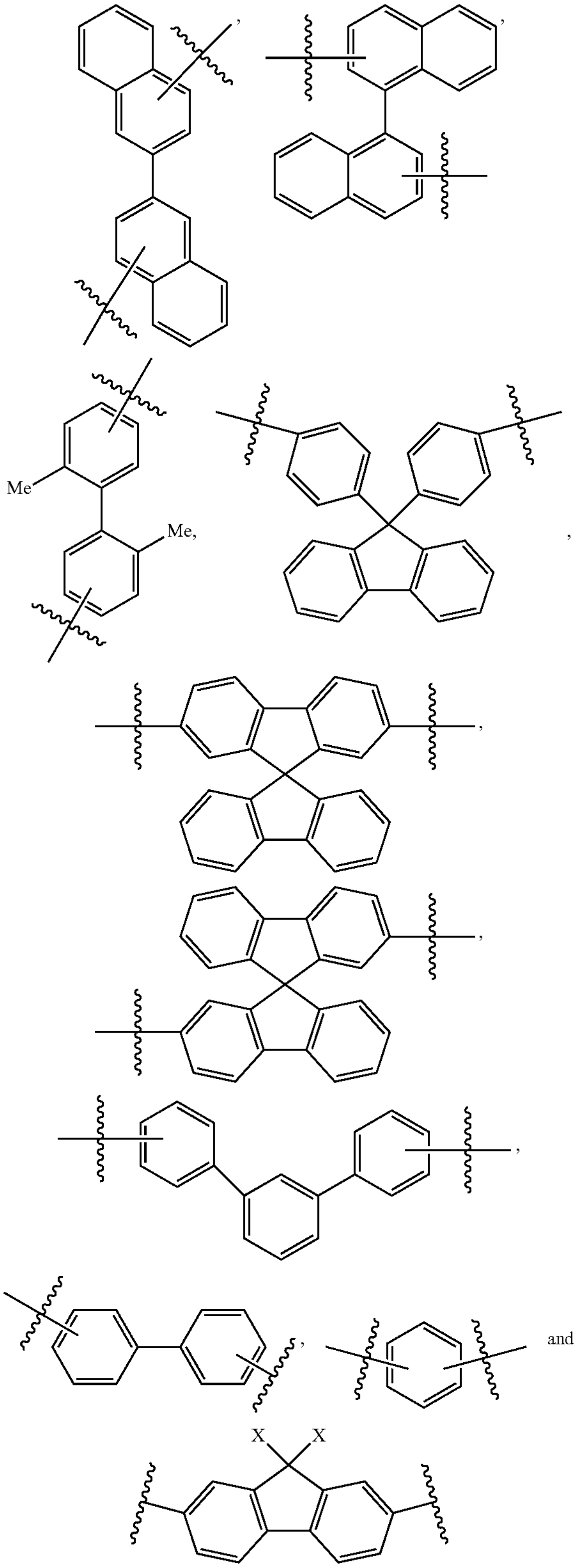

(provided that Xs are each independently hydrogen, an alkyl group having 1 to 8 carbon atoms or a phenyl group).

[6] The compound of [2], wherein, in the general formula (pre-I), $R^{1'}$ to $R^{5'}$ when they are aromatics, are each independently one kind selected from the group consisting of

[Formula 6]

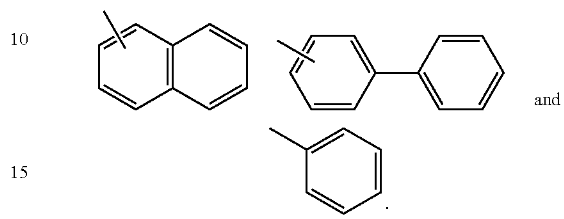

[7] The compound of any of [1] to [6], which is used as an electrolyte of an anode catalyst layer and/or a cathode catalyst layer of a polymer electrolyte fuel cell.

[8] A catalyst layer of a polymer electrolyte fuel cell which comprises the compound of any of [1] to [6].

[9] A catalyst composition which comprises the compound of any of [1] to [6], a metal catalyst and a catalyst carrier.

[10] The catalyst composition of [9], which is for a polymer electrolyte fuel cell. [11] A catalyst layer of a polymer electrolyte fuel cell which comprises the catalyst composition of [10].

[12] A membrane electrode assembly which comprises a polymer electrolyte membrane, a gas diffusion layer and the catalyst layer of [11].

[13] A polymer electrolyte fuel cell which comprises the membrane electrode assembly of [12].

Effects of the Invention

The compound of the present invention has good solubility in polar solvents, and when it is used as an electrolyte in the catalyst layer of a polymer electrolyte fuel cell, the polymer electrolyte fuel cell exhibits excellent power generation characteristics.

BRIEF DESCRIPTION OF THE DRAWING

FIG. 1 is a sectional view schematically showing the constitution of the polymer electrolyte fuel cell.

EMBODIMENT TO CARRY OUT THE INVENTION

First Embodiment of the Present Invention

The first embodiment of the present invention relates to a compound having a structure represented by the following general formula (I).

[Formula 7]

(I)

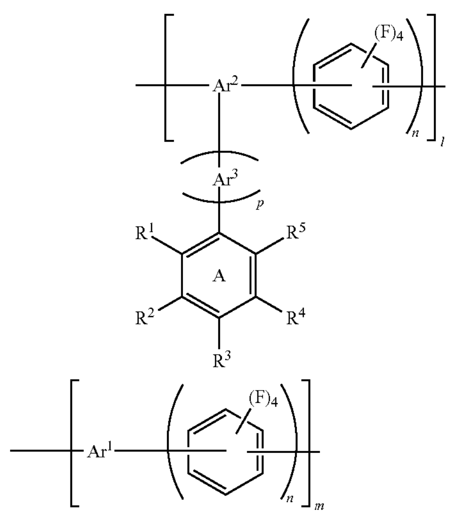

(in the general formula (I), $Ar^1$ is an aromatic structure optionally substituted by a sulfonic acid group(s), $Ar^2$ is an aromatic structure optionally substituted by a sulfonic acid group(s), $Ar^3$ is an aromatic structure optionally substituted by a sulfonic acid group(s), provided that when p=1, $Ar^2$ is a benzene ring optionally substituted by a sulfonic acid group(s), $R^1$ to $R^5$ are each independently hydrogen, a sulfonic acid group or an aromatic group, and the aromatic groups are each independently and optionally substituted by a sulfonic acid group(s), one of $R^1$ to $R^5$ is hydrogen or a sulfonic acid group, and four are aromatic groups, one or more of the groups selected from the group consisting of $Ar^1$, $Ar^2$, and $Ar^3$, $R^1$, $R^2$, $R^3$, $R^4$ and $R^5$, when they are aromatic groups, and benzene ring A has one or more sulfonic acid groups, l and m are molar fractions when l+m=1.0, where $0<l\leq 1.0$ and $0\leq m<1.0$, and when m is not 0, each constitutional unit is randomly copolymerized, "n"s are each independently an integer of 1 to 3, and p is 0 or 1.)

$Ar^1$, $Ar^2$, $Ar^3$, $R^1$, $R^2$, $R^3$, $R^4$, $R^5$, l, m, n and p in the general formula (I) are as mentioned below.

$Ar^1$ is an aromatic structure, and optionally substituted by a sulfonic acid group(s). $Ar^1$ preferably has no substituents other than the sulfonic acid group.

As the aromatic structure, there may be mentioned monocyclic aromatics, polycyclic aromatics, fused aromatic rings and aromatic heterocycles, and preferably monocyclic aromatics and polycyclic aromatics.

$Ar^1$ is more preferably one kind selected from the group consisting of the following (provided that Xs are each independently hydrogen, an alkyl group having 1 to 8 carbon atoms or a phenyl group) and optionally substituted by a sulfonic acid group(s),

[Formula 8]

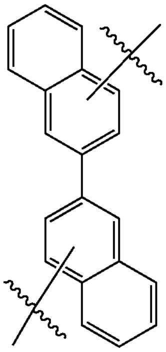, 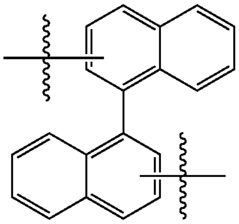,

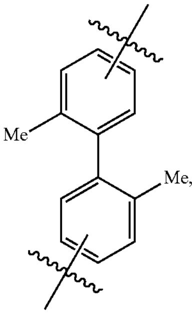 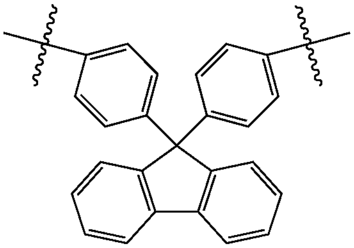,

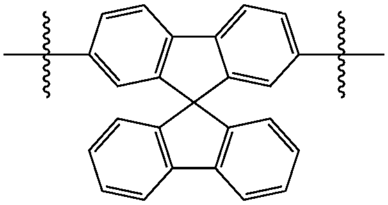,

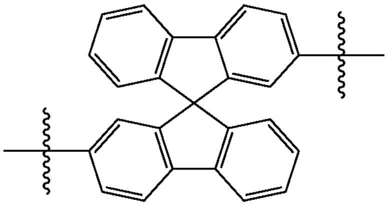,

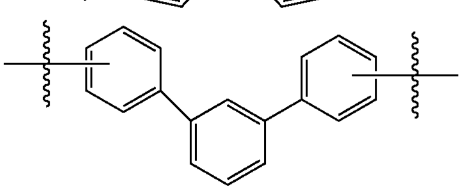,

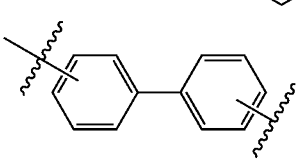, 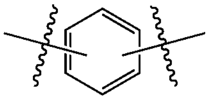 and

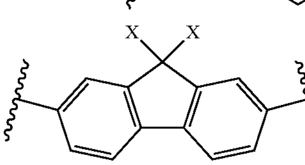

and further preferably one kind selected from the group consisting of the following, and optionally substituted by a sulfonic acid group(s).

[Formula 9]

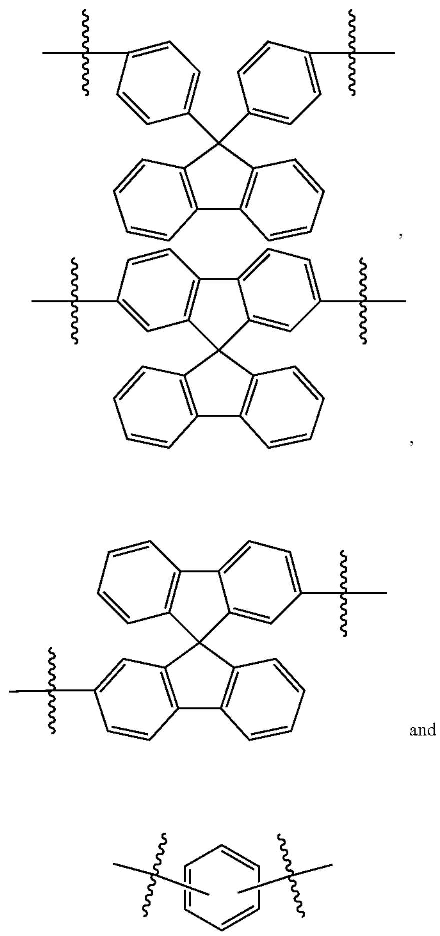

,

, and $Ar^2$ is an aromatic structure and optionally substituted by a sulfonic acid group(s). $Ar^2$ preferably has no substituents other than the sulfonic acid group.

As the aromatic structure, there may be mentioned monocyclic aromatics, polycyclic aromatics, fused aromatic rings and aromatic heterocycles, preferably monocyclic aromatics and polycyclic aromatics, and more preferably a benzene ring.

The aromatic heterocycles are cyclic compounds containing one or more nitrogen, sulfur, and oxygen other than carbon. As the aromatic heterocycles containing nitrogen, there may be mentioned pyridine, pyrazine, pyrimidine, pyridazine, quinoline, isoquinoline, etc., as the aromatic heterocycles containing sulfur, there may be mentioned thiophene, benzothiophene, etc., and as the aromatic heterocycles containing oxygen, there may be mentioned furan, benzofuran, etc.

When p=1, $Ar^2$ is a benzene ring, and optionally substituted by a sulfonic acid group(s).

$Ar^3$ is an aromatic structure, and optionally substituted by a sulfonic acid group(s). $Ar^3$ preferably has no substituents other than the sulfonic acid group.

As the aromatic structure, the same as that exemplified for $Ar^2$ may be mentioned.

$R^1$ to $R^5$ are each independently hydrogen, a sulfonic acid group or an aromatic group, wherein one of $R^1$ to $R^5$ is hydrogen or a sulfonic acid group, and four are aromatic groups. The aromatic groups may each independently and optionally have a sulfonic acid group(s). The aromatic groups preferably have no substituents other than the sulfonic acid group.

As $R^1$ to $R^5$ when they are aromatic groups, they are each independently one kind selected from the group consisting of

[Formula 10]

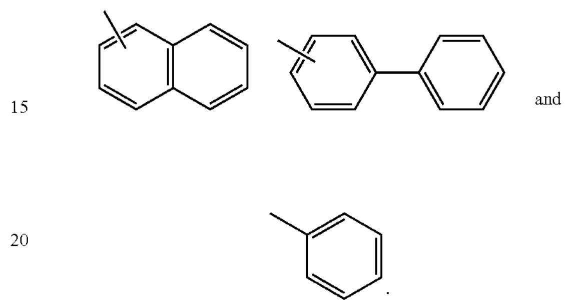

and and optionally have a sulfonic acid group(s), and more preferably they are

[Formula 11]

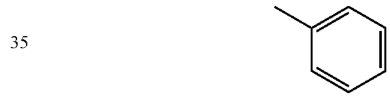

and optionally have a sulfonic acid group(s).

$R^1$ and $R^4$ are preferably the same, and $R^2$ and $R^3$ are preferably the same. $R^5$ is preferably hydrogen or a sulfonic acid group.

One or more of the groups selected from the group consisting of $Ar^1$, $Ar^2$, and $Ar^3$, $R^1$, $R^2$, $R^3$, $R^4$ and $R^5$, when they are aromatic groups, and benzene ring A have one or more sulfonic acid groups.

It is preferred that one or more of the groups selected from the group consisting of $R^1$, $R^2$, $R^3$, $R^4$ and $R^5$, when they are aromatic groups, have one or more sulfonic acid groups.

A number of the sulfonic acid group of the compound represented by the general formula (I) is preferably 1 to 8, more preferably 1 to 5, and further preferably 2 to 4.

l and m are molar fractions when $l+m=1.0$, where $0<l\leq 1.0$ and $0\leq m<1.0$, and $0.5<l\leq 1.0$ and $0\leq m<0.5$ are preferred. When m is not 0, each constitutional unit where molar fractions are l and m is randomly copolymerized.

"n"s are each independently an integer of 1 to 3, and 1 or 2 is preferred.

p is 0 or 1, and 0 is preferred.

As the compound represented by the above-mentioned general formula (I), there may be preferably mentioned the compound represented by the following general formula (Ia).

[Formula 12]

(Ia)

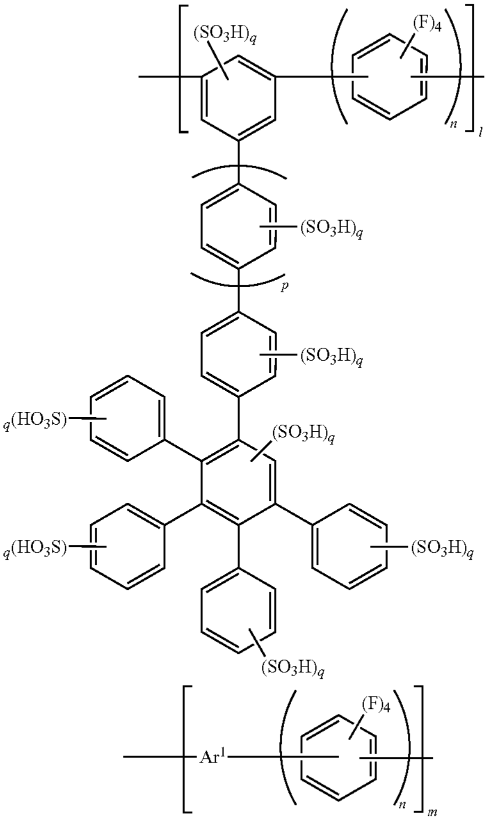

In the above-mentioned general formula (Ia), $Ar^1$, l, m, n and p are as defined in the general formula (I). "q"s are each independently 0 or 1, and there is no case where all "q"s are 0, and the sum of all "q"s is preferably 1 to 8, more preferably 1 to 5, and further preferably 2 to 4.

Method for Producing the Compound

The compound represented by the general formula (I) is produced by the following producing method.

In the following producing method, $Ar^{1\prime}$, $Ar^{2\prime}$, $Ar^{3\prime}$, $R^{1\prime}$, $R^{2\prime}$, $R^{3\prime}$, $R^{4\prime}$, and $R^{5\prime}$ are as defined in the general formula (I), except that they do not have a sulfonic acid group, unless otherwise specifically mentioned. That is, they are as defined in the general formula (pre-I) in the second embodiment of the present invention mentioned later. l, m, n and p are as defined in the general formula (I) unless otherwise specifically mentioned.

(1) Step 1

In Step 1, a bis-halogen monomer having a benzene skeleton which has substituents of $R^{1\prime}$ to $R^{5\prime}$ having no sulfonic acid group is produced by the following producing method.

In Step 1, a compound represented by the formula (i) and $Ar^{2\prime}$ which is substituted by an ethynyl group and dihalogen and is not substituted by a sulfonic acid group are subjected to Diels-Alder reaction to obtain a compound represented by the formula (v) which is a bis-halogen monomer. Or a compound represented by the formula (i) and $Ar^{3\prime}$ which is substituted by an ethynyl group and mono-halogen and is not substituted by a sulfonic acid group are subjected to Diels-Alder reaction, followed by conversion of the halogen group to a boronic acid group or a boronic acid ester group, and further subjected to Suzuki-Miyaura reaction to obtain a compound represented by the formula (iv) which is a bis-halogen monomer. The reaction temperature is usually 20 to 200° C.

[Formula 13]

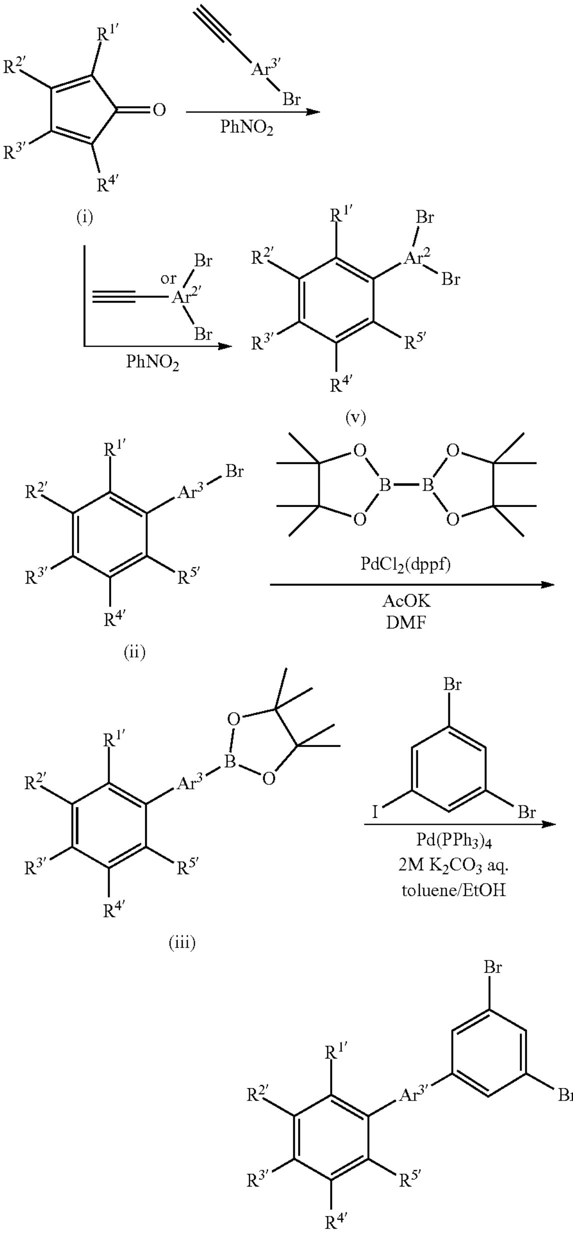

(i) (v) (ii) (iii) (iv)

(2) Step 2

In Step 2, using a palladium catalyst, the reaction of Scheme A or Scheme B is carried out to obtain a fluorine-containing compound represented by the following general formula (pre-I).

[Formula 14]
(pre-I)
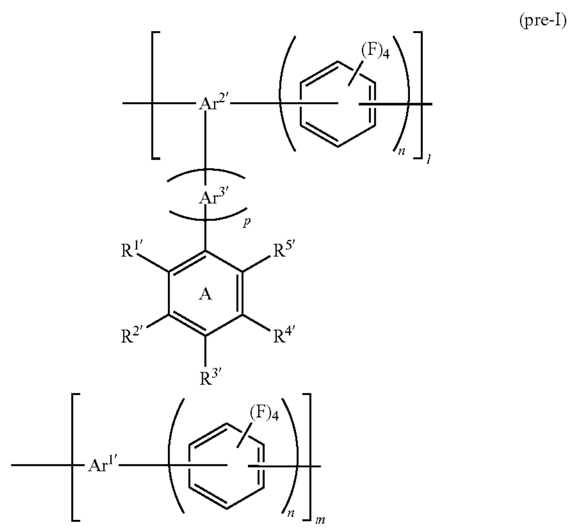
Incidentally, the general formula (pre-I') is the case where m=0) in the general formula (pre-I), and the general formula (pre-I") is the case where m is not 0 in the general formula (pre-I).
Scheme A
[Formula 15]
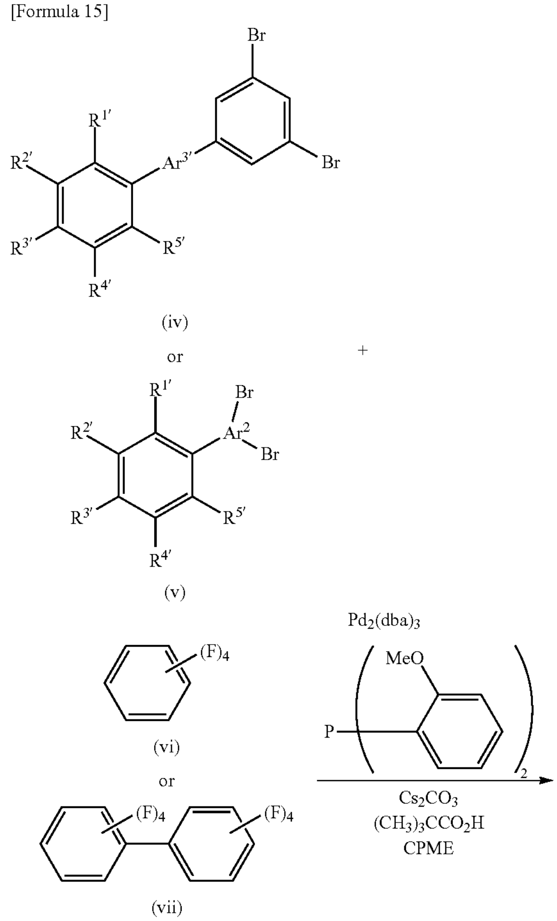
-continued
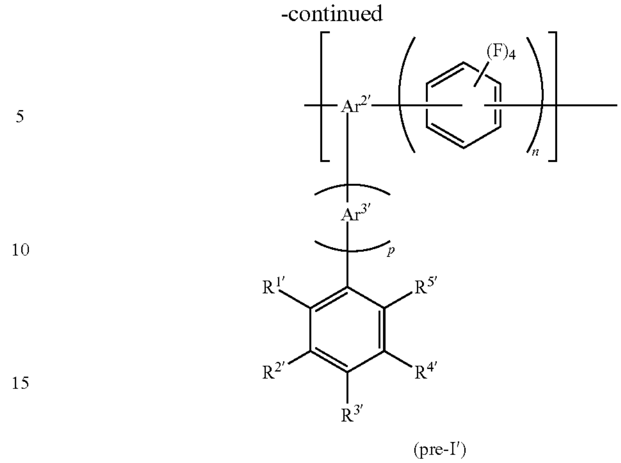
(pre-I')
Scheme B
[Formula 16]
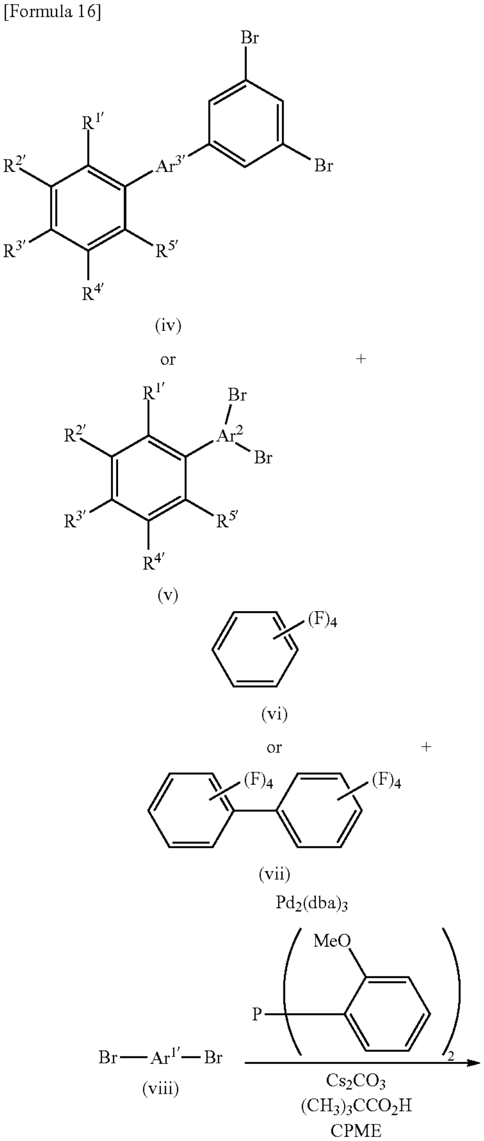

-continued

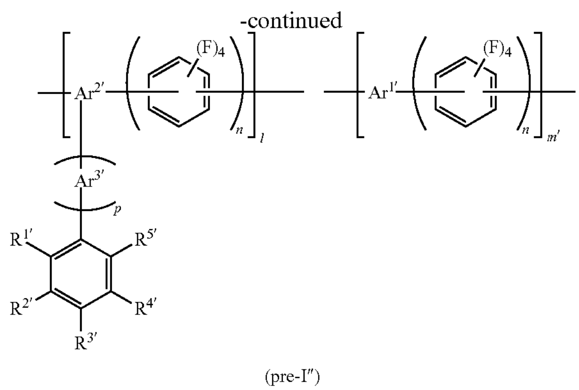

(pre-I″)

Provided that, in Scheme B, $Ar^{1\prime}$ in the formula (viii) is not substituted by a sulfonic acid group. In addition, in the general formula (pre-I″), 0<m′<1.0.

A number average molecular weight (Mn) of the compound represented by the general formula (pre-I) measured by the method described in Examples is preferably 5,000 to 100,000, more preferably 6,000 to 80,000, and further preferably 8,000 to 60,000.

A polydispersity index (PDI) of the compound represented by the general formula (pre-I) measured by the method described in Examples is preferably 1 to 8, more preferably 1 to 6, and further preferably 1 to 4.

(3) Step 3

In Step 3, the compound represented by the general formula (pre-I) is reacted with a sulfonating agent to obtain a compound represented by the general formula (I) in which a sulfonic acid group(s) is/are introduced into the compound represented by the general formula (pre-I). The sulfonic acid group(s) is/are introduced into one or more of the groups selected from the group consisting of $Ar^{1\prime}$, $Ar^{2\prime}$, and $Ar^{3\prime}$, $R^{1\prime}$, $R^{2\prime}$, $R^{3\prime}$, $R^{4\prime}$ and $R^{5\prime}$, when they are an aromatic group, and a benzene ring having substituents of $R^{1\prime}$ to $R^{5\prime}$ in the general formula (pre-I).

As the sulfonating agent, there may be mentioned trimethylsilyl chloride sulfate, sulfonic acid chloride, fuming sulfuric acid, sulfuric acid, etc. The sulfonating agent is preferably reacted in an amount of 0.5 to 6-fold in terms of an equivalent ratio based on the molecular weight of the unit structure calculated using the molar fraction in the fluorine-containing polymer represented by the general formula (pre-I).

As the solvent to be used in the reaction, there may be mentioned a halogen-based solvent such as methylene chloride, chloroform, etc.

The reaction temperature is generally 0 to 100° C.

Second Embodiment of the Present Invention

The second embodiment of the present invention relates to a compound obtained by reacting a sulfonating agent with a compound represented by the following general formula (pre-I).

[Formula 17]

(pre-I)

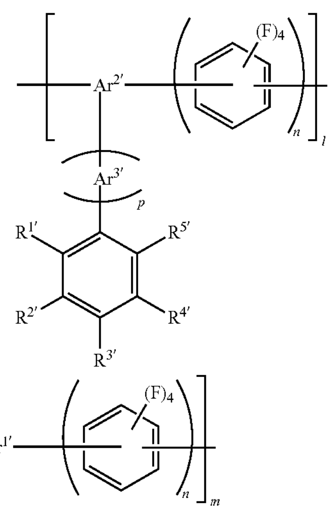

(In the general formula (pre-I), $Ar^{1\prime}$ is an aromatic structure, $Ar^{2\prime}$ is an aromatic structure, $Ar^{3\prime}$ is an aromatic structure, provided that when p=1, $Ar^{2\prime}$ is a benzene ring, $R^1$ to $R^{5\prime}$ are each independently hydrogen or an aromatic group, one of $R^{1\prime}$ to $R^{5\prime}$ is hydrogen, and four are aromatic groups, l and m are molar fractions when l+m=1.0, where $0<l\leq 1.0$ and $0\leq m<1.0$, and when m is not 0, each constitutional unit is randomly copolymerized, "n"s are each independently an integer of 1 to 3, p is 0 or 1.)

$Ar^{1\prime}$, $Ar^{2\prime}$, $Ar^{3\prime}$, $R^{1\prime}$, $R^{2\prime}$, $R^{3\prime}$, $R^{4\prime}$, $R^{5\prime}$, l, m, n and p in the general formula (pre-I) are as mentioned below.

$Ar^{1\prime}$ is an aromatic structure. $Ar^{1\prime}$ preferably has no substituent.

As the aromatic structure, there may be mentioned monocyclic aromatics, polycyclic aromatics, fused aromatic rings and aromatic heterocycles, and preferably monocyclic aromatics and polycyclic aromatics.

$Ar^{1\prime}$ is more preferably one kind selected from the group consisting of the following (provided that Xs are each independently hydrogen, an alkyl group having 1 to 8 carbon atoms or a phenyl group),

[Formula 18]

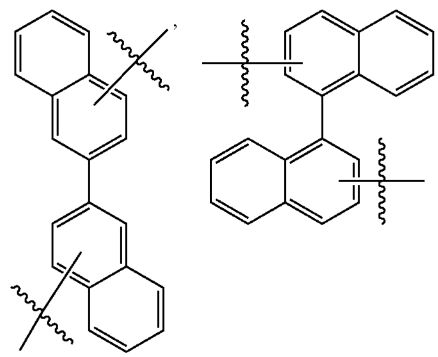

-continued

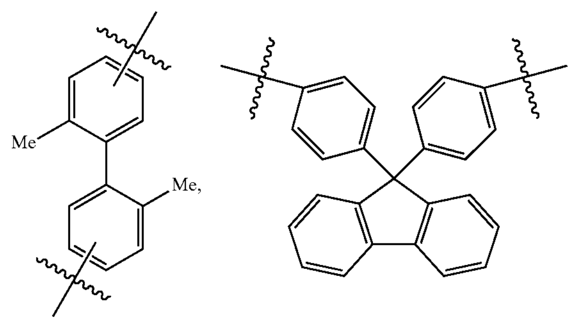

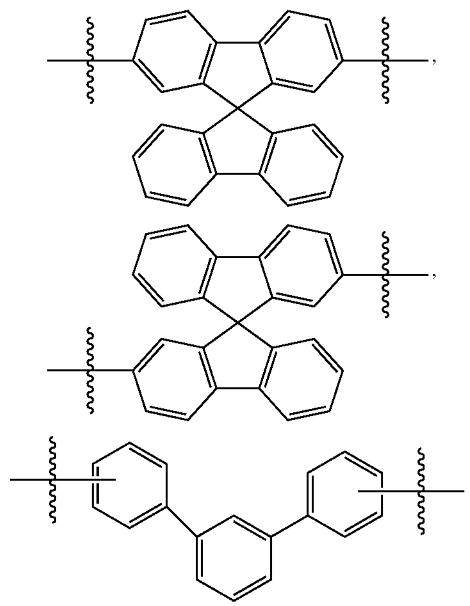

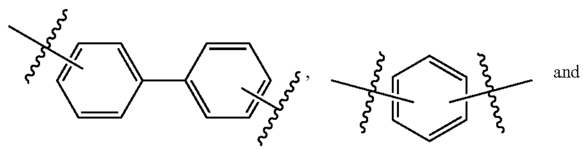

and

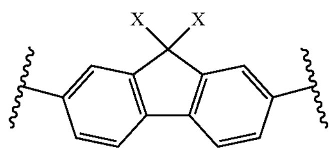

and further preferably at least one kind selected from the following group.

[Formula 19]

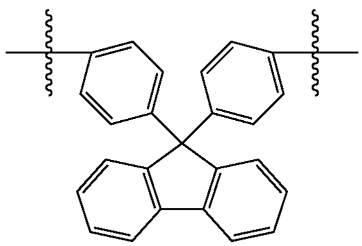

-continued

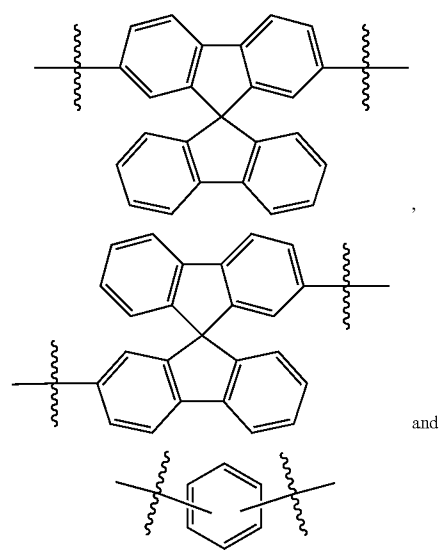

$Ar^{2'}$ is an aromatic structure. As the aromatic structure, there may be mentioned monocyclic aromatics, polycyclic aromatics, fused aromatic rings and aromatic heterocycles, preferably monocyclic aromatics and aromatic heterocycles, and more preferably a benzene ring. It is preferred that $Ar^{2'}$ has no substituent.

The aromatic heterocycles are cyclic compound containing one or more nitrogen, sulfur or oxygen other than carbon. As the aromatic heterocycles containing nitrogen, there may be mentioned pyridine, pyrazine, pyrimidine, pyridazine, quinoline, isoquinoline, etc., as the aromatic heterocycles containing sulfur, there may be mentioned thiophene, benzothiophene, etc., the aromatic heterocycles containing oxygen, there may be mentioned furan, benzofuran, etc.

When p=1, $Ar^{2'}$ is a benzene ring.

$Ar^{3'}$ is an aromatic structure. As the aromatic structure, the same as those exemplified in $Ar^{2'}$ may be mentioned. It is preferred that $Ar^{3'}$ has no substituent.

$R^{1'}$ to $R^{5'}$ are each independently hydrogen or an aromatic group, and one of $R^{1'}$ to $R^{5'}$ is hydrogen, and four are aromatic groups. When $R^{1'}$ to $R^{5'}$ are aromatic groups, it is preferred that they have no substituent.

As $R^{1'}$ to $R^{5'}$ when they are aromatic groups, it is preferred that they are each independently one kind selected from the group consisting of

[Formula 20]

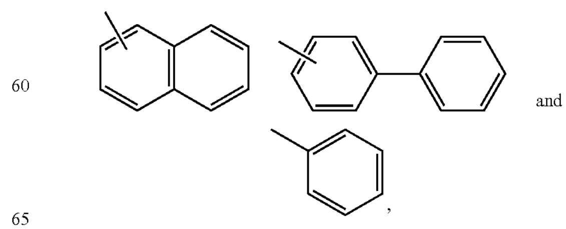

and more preferably

[Formula 21]

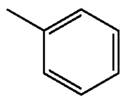

It is preferred that $R^{1'}$ and $R^{4'}$ are the same, and $R^{2'}$ and $R^{3'}$ are the same.

$R^{5'}$ is preferably a hydrogen.

l and m are molar fractions when l+m=1.0, where $0<l\leq1.0$ and $0\leq m<1.0$, and $0.5<l\leq1.0$ and $0\leq m<0.5$ are preferred. When m is not 0, each constitutional unit of which molar fractions are l and m is randomly copolymerized.

"n"s are each independently an integer of 1 to 3, and preferably 1 or 2.

P is 0 or 1, and preferably 0.

A number average molecular weight (Mn) of the compound represented by the general formula (pre-I) measured by the method described in Examples is preferably 5,000 to 100,000, more preferably 6,000 to 80,000, and further preferably 8,000 to 60,000.

A polydispersity index (PDI) of the compound represented by the general formula (pre-I) measured by the method described in Examples is preferably 1 to 8, more preferably 1 to 6, and further preferably 1 to 4.

The compound represented by the general formula (pre-I) can be obtained by the producing method containing Step 1 and Step 2 of the producing method of the first embodiment.

As the sulfonating agent, there may be mentioned trimethylsilyl chloride sulfate, sulfonic acid chloride, fuming sulfuric acid, sulfuric acid, etc.

Specifically, the compound of the second embodiment of the present invention can be obtained by the same reaction as Step 3 of the producing method of the first embodiment of the present invention.

It is preferred that in the compound of the second embodiment of the present invention, by reacting a sulfonating agent with the compound represented by the general formula (pre-I), a sulfonic acid group(s) is/are introduced into at least one of the groups selected from the group consisting of $Ar^{1'}$, $Ar^{2'}$, and $Ar^{3'}$, $R^{1'}$, $R^{2'}$, $R^{3'}$, $R^{4'}$ and $R^{5'}$, where they are aromatic groups, and a benzene ring having substituents of $R^{1'}$ to $R^{5'}$ in the general formula (pre-I).

[Polymer Electrolyte Fuel Cell]

FIG. 1 is a sectional view schematically showing the constitution of the polymer electrolyte fuel cell (hereinafter also referred to as "fuel cell").

The polymer electrolyte fuel cell 100 has an anode catalyst layer 103, a cathode catalyst layer 105 and a polymer electrolyte membrane 107 sandwiched between both catalyst layers, and each catalyst layer has a gas diffusion layer (Gas Diffusion Layer, hereinafter also referred to as "GDL".) 101 at the outside. This constitution is referred to as a membrane electrode assembly (Membrane Electrode Assembly, hereinafter also referred to as "MEA"). In the polymer electrolyte fuel cell, this membrane electrode assembly (MEA) is usually sandwiched between separators 109.

The compound represented by the above-mentioned general formula (I) can be used for the anode catalyst layer 103, the cathode catalyst layer 105 and the polymer electrolyte membrane 107 of the fuel cell, preferably used for the anode catalyst layer 103 and the cathode catalyst layer 105 of the fuel cell, and from the viewpoint of suppressing overvoltage rise caused by decrease in oxygen gas diffusivity at the time of high current driving, more preferably used for at least the cathode catalyst layer 105.

A catalyst carried on a catalyst carrier is called an electrocatalyst. In the present specification, the anode catalyst layer 103 and the cathode catalyst layer 105 are sometimes abbreviated to as catalyst layers.

The catalyst layers 103 and 105 each include a catalyst, a catalyst carrier for carrying the catalyst, and an electrolyte.

As the catalyst in the anode catalyst layer 103, known metal catalysts can be used without any particular limitation, and as the catalyst in the cathode catalyst layer 105, known metal catalysts can be used without any particular limitation. Such metal catalysts used in the anode catalyst layer 103 and the cathode catalyst layer 105 may be mentioned, for example, metals such as platinum, gold, silver, ruthenium, iridium, rhodium, palladium, osmium, tungsten, lead, iron, chromium, cobalt, nickel, manganese, vanadium, molybdenum, gallium, aluminum, etc., an alloy of these metals, and core/shell of these metals and the like.

As the catalyst carrier, there may be mentioned, for example, carbon materials including carbon blacks such as channel black, furnace black, thermal black, etc., activated carbon in which a material containing various carbon atoms has been carbonized and subjected to activation treatment, coke, natural graphite, artificial graphite, graphitized carbon, and the like, and carbon black is preferred since specific surface area is high and electronic conductivity is excellent.

As the electrolyte, the compound represented by the above-mentioned general formula (I) is used. The electrolyte may be used the compound represented by the above-mentioned general formula (I) alone, or may be used the compound represented by the above-mentioned general formula (I) optionally in combination with at least one kind of other electrolyte(s) selected from the group consisting of fluorine-based sulfonic acid polymers such as, for example, Nafion (Registered Trademark, available from Du Pont de Nemours and Company), Aquivion (Registered Trademark, available from Solvay S.A.), FLEMION (Registered Trademark, available from AGC Inc.), Aciplex (Registered Trademark, available from Asahi Kasei Corporation), and the like, hydrocarbon-based sulfonic acid polymers, and partially fluorine-introduced hydrocarbon-based sulfonic acid polymers.

A method of making the anode catalyst layer 103 and the cathode catalyst layer 105 will be explained. After preparing a catalyst composition containing the compound represented by the above-mentioned general formula (I), a metal catalyst and a catalyst carrier as a catalyst ink, the catalyst ink is coated on a target substrate and dried to prepare a catalyst layer. The catalyst composition may contain, as an electrolyte, an electrolyte other than the compound represented by the above-mentioned general formula (I) in addition to the compound represented by the above-mentioned general formula (I).

As the target substrate, there may be mentioned, for example, polyelectrolyte membrane, GDL, and sheets made of a fluorine resin, etc., and a catalyst layer can be prepared by a known producing method. When catalyst ink is coated on a sheet comprising a fluorine resin, the coated catalyst layer is transferred to the polymer electrolyte membrane. As the sheet comprising a fluorine resin, a sheet comprising polytetrafluoroethylene (PTFE) is generally mentioned.

The compound represented by the above-mentioned general formula (I) can cover the metal catalyst carried on the metal carrier with a suitable thickness, so that while maintaining the function of the catalyst, diffusibility of gas and proton conductivity are good. An amount of the compound represented by the above-mentioned general formula (I) to be used to the metal catalyst is preferably 0.1 to 10-fold.

The catalyst composition used as the catalyst ink may contain a binder and a solvent.

The binder can be used as a component to bind the catalyst carriers together to suppress decrease in electronic conductivity in the electrode catalyst. As the binder, there may be mentioned, for example, fluorine-based sulfonic acid polymers such as polytetrafluoroethylene (PTFE), polyvinylidene fluoride (PVDF), ethylene-propylene-diene copolymer (EPDM), Nafion (Registered Trademark, available from Du Pont de Nemours and Company), Aquivion (Registered Trademark, available from Solvay S.A.), FLEMION (Registered Trademark, available from AGC Inc.), Aciplex (Registered Trademark, available from Asahi Kasei Corporation), and the like. These may be used one kind alone or may be used two or more kinds in combination.

As the solvent, there may be mentioned, for example, polar solvents such as water, methanol, ethanol, 1-propanol, 2-propanol, 1-butanol, 2-butanol, isobutyl alcohol, tert-butyl alcohol, pentanol, dimethylsulfoxide, N,N-dimethylformamide, etc. As the above-mentioned solvents, water, methanol, ethanol, 1-propanol, 2-propanol, 1-butanol, 2-butanol and isobutyl alcohol are preferred. These may be used one kind alone or may be used two or more kinds in combination.

A content of each component in the catalyst composition is optionally adjusted depending on the purpose, and in 100% by mass solid content of the catalyst composition excluding the weight of the solvent, the metal catalyst is preferably 10 to 60% by mass, and more preferably 30 to 50% by mass, the electrolyte containing the compound represented by the above-mentioned general formula (I) is preferably 5 to 50% by mass, and more preferably 10 to 30% by mass, the catalyst carrier is preferably 20 to 75% by mass, and more preferably 30 to 50% by mass, and the binder is preferably 0 to 5% by mass, and more preferably 0 to 3% by mass. The component mentioned as the electrolyte and also as the binder is contained in the electrolyte in the above-mentioned formulation amount.

The solvent to be used in the catalyst composition is preferably 50 to 99% by mass, and more preferably 80 to 99% by mass per 100% by mass of the catalyst composition.

As the materials of the polymer electrolyte membrane 107, there may be mentioned the compound represented by the above-mentioned general formula (I), fluorine-based sulfonic acid polymers such as Nafion (Registered Trademark, available from Du Pont de Nemours and Company), Aquivion (Registered Trademark, available from Solvay S.A.), FLEMION (Registered Trademark, available from AGC Inc.), Aciplex (Registered Trademark, available from Asahi Kasei Corporation), etc., hydrocarbon-based sulfonic acid polymers, partially fluorine-introduced hydrocarbon-based sulfonic acid polymers, etc., and from the viewpoint of proton conductivity, there may be mentioned the compound represented by the above-mentioned general formula (I).

As for the thickness of the polymer electrolyte membrane 107, from the viewpoints of conductivity, durability, and cross leakage of gas, 10 to 100 μm is preferred, and 20 to 60 μm is more preferred.

As the gas diffusion layer 101, although there is no particular limitation, porous materials having conductivity are suitably used, and as such materials, there may be mentioned, for example, carbonaceous paper and non-woven fabrics, felts, non-woven fabrics, etc.

The above is described on the compound represented by the general formula (I) which is the first embodiment of the present invention, but the compound of the second embodiment of the present invention can be similarly used as in the compound represented by the general formula (I).

EXAMPLES

Hereinafter, the present invention will be explained in more detail by referring to Examples and Comparative Examples, but the present invention is not limited to these Examples.

[Measurement Method of Number Average Molecular Weight (Mn) and Weight Average Molecular Weight (Mw)]

It is the measurement results by gel permeation chromatography (hereinafter, it is abbreviated to as GPC). For the measurement, a GPC apparatus manufactured by TOSOH CORPORATION was used, and the measurement conditions, etc., are as follows.

GPC column: TSKgel SuperHZM-N; TSKgel SuperHZ3000; TSKgel SuperHZ2000 (TOSOH CORPORATION)

Column temperature: 40° C.

Solvent: Tetrahydrofuran (THF)

Flow amount: 0.6 ml/min

Standard sample: Polystyrene (TOSOH CORPORATION)

Synthetic Example 1: Synthesis of Compound M-1

[Formula 22]

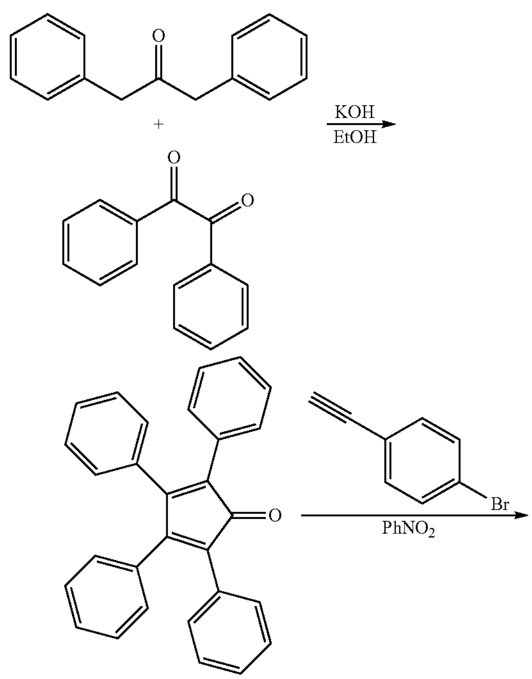

Int-1

-continued

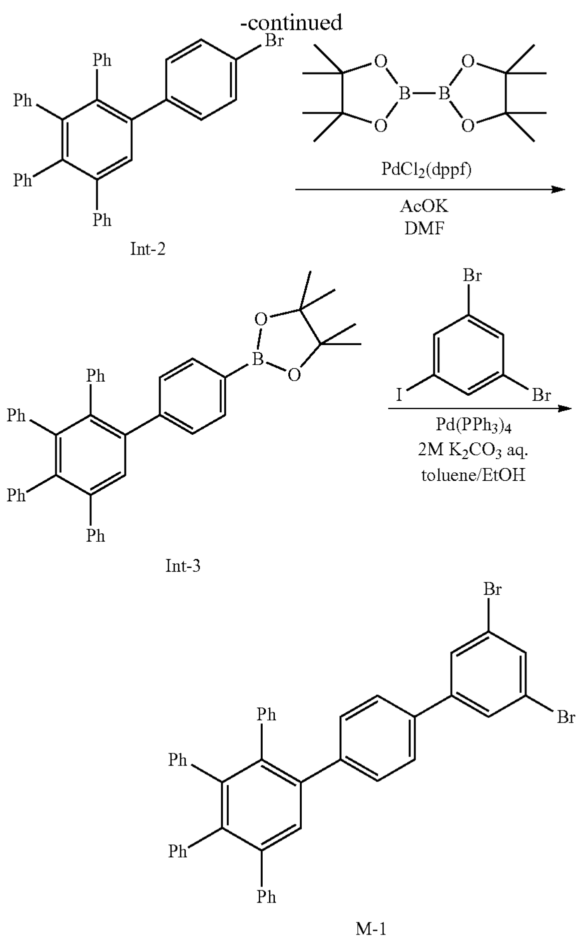

Int-2

Int-3

M-1

(1) Synthesis of Int-1

Under nitrogen atmosphere, in a reaction apparatus were each charged 5.16 g of 2,2'-(1,4-phenylene)bis(1-phenylene-1,2-dione) and 6.66 g of 1,3-diphenylpropan-2-one, and 320 ml of ethanol was added thereto. The reaction mixture was heated and refluxed, then a solution prepared with 1.69 g of potassium hydroxide and 8 ml of ethanol was added dropwise, and the mixture was stirred under heat reflux conditions for 30 minutes. After cooling to room temperature, the mixture was further stirred for one hour while cooling in an ice bath, and then filtered. The obtained filtrated product was dried to obtain 8.94 g (Yield 86%) of the target Int-1.

$^1$H NMR (500 MHz, DMSO-d6) δ (ppm): 7.21-7.24 (m, 12H), 7.15-7.18 (m, 4H), 6.92-6.93 (m, 4H).

(2) Synthesis of Int-2

Under nitrogen atmosphere, in a reaction apparatus were each charged 12 g of Int-1 and 6.2 g of 1-bromo-4-ethynylbenzene, and 60 mL of nitrobenzene was added thereto. The reaction mixture was heated to 180° C. and stirred for 7 hours. After cooling to room temperature, the mixture was added dropwise to methanol, and after stirring, filtration was carried out and the filtrated product was dried to obtain 15 g (Yield 91%) of the target Int-2.

(3) Synthesis of Int-3

Under nitrogen atmosphere, in a reaction apparatus were charged 10 g of Int-2, 5.7 g of bis(pinacolato)diboron, 0.91 g of [1,1'-bis(diphenylphosphino)ferrocene]-dichloro-palladium(II) dichloromethane adduct, 5.5 g of potassium acetate and 70 mL of N,N-dimethylformamide. The reaction mixture was heated to 150° C. and stirred for 18 hours. After cooling to room temperature, the mixture was added dropwise to deionized water, and after stirring, filtration was carried out and the filtrated product was dried. The filtrated product after drying was dissolved, then, separation and purification were carried out by column chromatography (chloroform/hexane=1/1) to obtain 7.4 g (Yield 68%) of the target Int-3.

$^1$H NMR (500 MHz, $CDCl_3$) δ (ppm): 7.60 (d, J=8.0 Hz, 2H), 7.55 (s, 1H), 7.18 (d, J=8.0 Hz, 2H), 7.14-7.16 (m, 5H), 6.90-6.92 (m, 6H), 6.83-6.87 (m, 7H), 6.76-6.78 (m, 2H), 1.32 (s, 12H).

(4) Synthesis of M-1

Under nitrogen atmosphere, in a reaction apparatus were charged 7.0 g of Int-3, 6.5 g of 1,3-dibromo-5-iodobenzene and 0.70 g of tetrakistriphenylphosphine palladium, and 100 mL of 2M aqueous potassium carbonate, 70 mL of ethanol and 175 mL of toluene were added to the mixture. The reaction mixture was heated to 80° C. and stirred for 3.5 hours. After cooling to room temperature, liquid separation was carried out and the obtained organic layer was dried over sodium sulfate. Condensation was carried out and the obtained condensate was subjected to separation and purification by column chromatography (with gradient of chloroform/hexane=from 1/3 to 1/1) to obtain 7.4 g (Yield 89%) of the target M-1.

$^1$H NMR (500 MHz, $CDCl_3$) δ (ppm): 7.61-7.62 (m, 2H), 7.59 (m, 2H), 7.34 (d, J=8.0 Hz, 2H), 7.24 (d, J=8.0 Hz, 2H), 7.16 (m, 5H), 6.93-6.96 (m, 6H), 6.84-6.88 (m, 7H), 6.78-6.80 (m, 2H).

Synthetic Example 2: Synthesis of Compound M-2

[Formula 23]

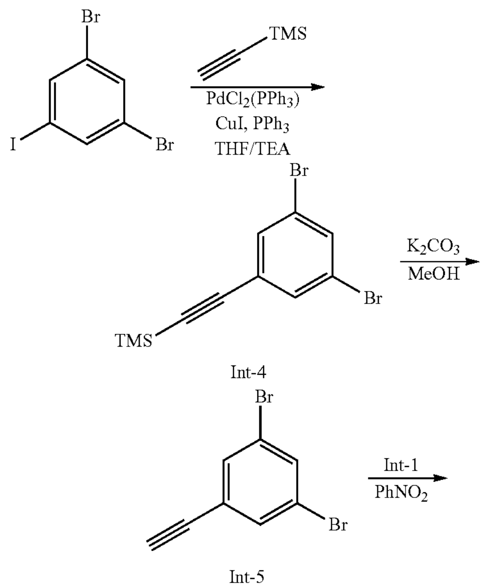

Int-4

Int-5

-continued

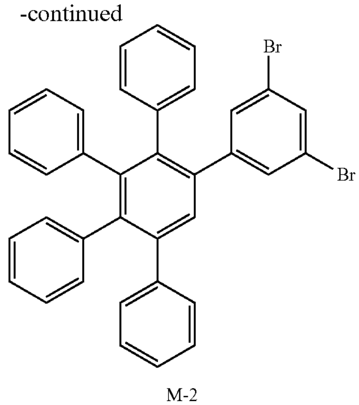

M-2

(1) Synthesis of Int-4

Under nitrogen atmosphere, in a reaction apparatus were charged 5.0 g of 1,3-dibromo-5-iodobenzene, 0.29 g of bis(triphenylphosphine)palladium dichloride, 0.081 g of copper iodide, 0.11 g of triphenylphosphine and 1.5 g of trimethylsilylacetylene, and 5 mL of tetrahydrofuran and 10 mL of triethylamine were added to the mixture. The reaction mixture was heated to 50° C. and stirred for 8.5 hours. After cooling the reaction mixture to room temperature, silica gel filtration was carried out, and the obtained filtrate was evaporated to dryness. The residue was dissolved by adding hexane, and separation and purification were carried out by column chromatography (hexane) to obtain 4.0 g (Yield 87%) of the target Int-4.

$^1$H NMR (500 MHz, $CDCl_3$) δ (ppm): 7.61 (t, J=2.0 Hz, 1H), 7.53 (d, J=2.0 Hz, 2H), 0.24 (s, 9H).

(2) Synthesis of Int-5

In a reaction apparatus were charged 4.0 g of Int-4 and 5.0 g potassium carbonate, and 50 mL of methanol was added to the mixture. The reaction mixture was stirred at room temperature for 72 hours. The reaction mixture was filtered and the obtained filtrate was concentrated and evaporated to dryness. The residue was dissolved in chloroform, and deionized water was added thereto and liquid separation was carried out (twice). After drying the organic layer over sodium sulfate, concentration and drying were carried out to obtain 2.4 g (Yield 75%) of the target Int-5.

$^1$H NMR (500 MHz, $CDCl_3$) δ (ppm): 7.66 (t, J=1.5 Hz, 1H), 7.56 (d, J=1.5 Hz, 2H), 3.16 (s, 1H).

(3) Synthesis of M-2

Under nitrogen atmosphere, in a reaction apparatus were charged 3.4 g of Int-1 and of 2.3 g Int-5, and 20 mL of nitrobenzene was added to the mixture. The reaction mixture was heated to 180° C. and stirred for 17 hours. After cooling to room temperature, the reaction mixture was added drop-wise to methanol, and after stirring, filtration was carried out and the filtrated product was dried to obtain 4.1 g (Yield 76%) of the target M-2.

$^1$H NMR (500 MHz, $CDCl_3$) δ (ppm): 7.49 (s, 1H), 7.43 (t, J=1.5 Hz, 1H), 7.23 (d, J=1.5 Hz, 2H), 7.13-7.18 (m, 5H), 7.00-7.01 (m, 3H), 6.92-6.94 (m, 3H), 6.82-6.88 (m, 7H), 6.76-6.78 (m, 2H).

Synthetic Example 3: Synthesis of M-3

[Formula 24]

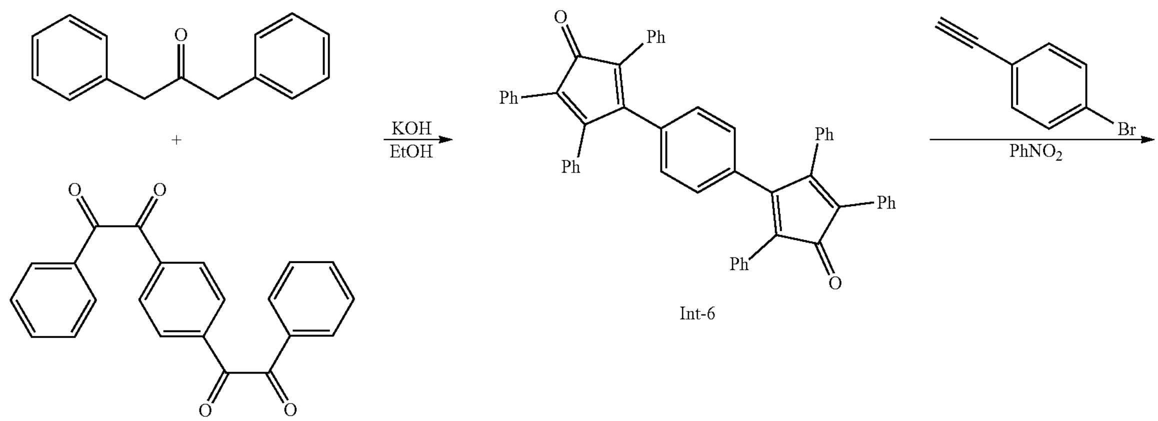

Int-6

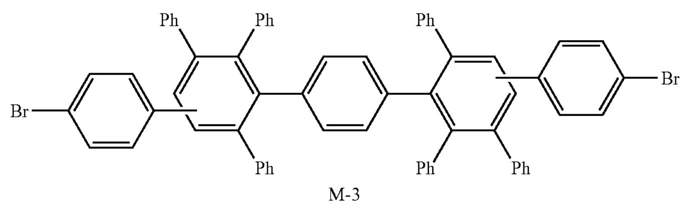

M-3

(1) Synthesis of Int-6

Under nitrogen atmosphere, 25.0 g of 1,4-bisbenzyl and 32.3 g of 1,3-diphenylpropan-2-one were each charged, and 200 g of ethanol was added to the mixture. After the reaction mixture was heated and refluxed, a solution prepared from 8.23 g of potassium hydroxide and 50 g of ethanol was added dropwise thereto, and the mixture was stirred under heating and reflux conditions for 30 minutes. After cooling to room temperature, the mixture was further stirred for 1 hour and then filtration was carried out. The obtained filtrated product was dried to obtain 41.7 g (Yield 83%) of the target Int-6.

$^1$H NMR (500 MHz, $CDCl_3$) δ (ppm): 7.59 (m, 4H), 7.28-7.21 (m, 22H), 7.19 (m, 4H), 7.05 (m, 4H), 6.94 (m, 4H).

(2) Synthesis of M-3

Under nitrogen atmosphere, in a reaction apparatus were charged 20.0 g of Int-6 and 11.0 g of 1-bromo-4-ethynylbenzene, and 100 mL of nitrobenzene was added to the mixture. The reaction mixture was heated to 180° C. and stirred for 19 hours. After cooling to room temperature, the reaction mixture was added dropwise to methanol, and after stirring, filtration was carried out and the filtrated product was dried to obtain 26.8 g (Yield 93%) of the target M-3.

$^1$H NMR (500 MHz, CDCl3) δ (ppm): 7.45 (m, 2H), 7.28-7.26 (m, 4H), 7.23-7.20 (m, 3H), 7.15-7.14 (m, 3H), 7.10-7.07 (m, 3H), 7.04-6.92 (m, 17H), 6.79-6.76 (m, 3H), 6.72-6.69 (m, 4H), 6.66-6.64 (m, 1H), 6.41 (m, 1H), 6.34 (m, 2H), 6.27 (s, 1H).

Example 1: Synthesis of Electrolyte 1

(1) Synthesis of P-1

[Formula 25]

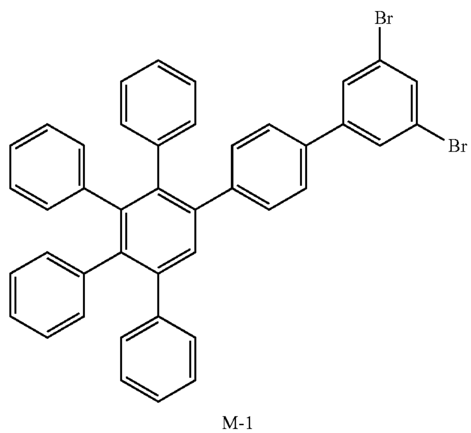

M-1

+

-continued

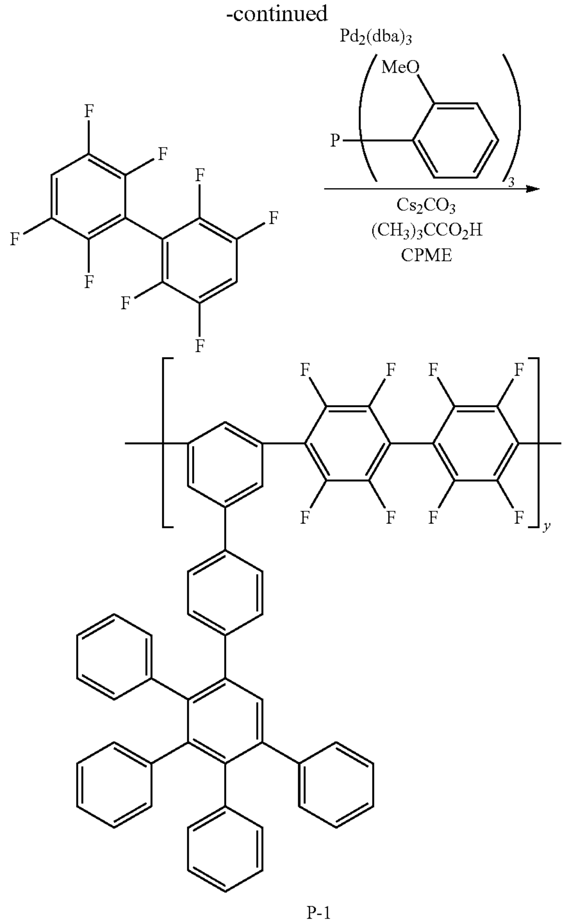

P-1

Under nitrogen atmosphere, in a reaction apparatus were charged 0.70 g of M-1, 0.30 g of 2,2',3,3',5,5',6,6'-octafluorobiphenyl, 0.0096 g of tris(dibenzylidene-acetone)dipalladium, 0.015 g of tris(o-methoxyphenyl)phosphine, 1.1 g of cesium carbonate and 0.10 g of pivalic acid, and 8 mL of cyclopentyl methyl ether was added to the mixture. The reaction mixture was heated to 105° C. and stirred for 9.5 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.2% sodium N,N-diethyldithiocarbamate trihydrate methanol solution and stirred. Filtration was carried out and the obtained filtrated product was dried to obtain 0.54 g (Yield 65%) of the target P-1.

Mn 16,400 (PDI 1.69)

(2) Synthesis of Electrolyte 1

In a reaction apparatus were charged 0.30 g of P-1 and 15 mL of methylene chloride, and 0.79 g of trimethylsilyl chlorosulfonate was added to the mixture. After the reaction mixture was stirred at room temperature for 2 hours, ethanol was added thereto to stop the reaction. The reaction mixture was added dropwise to diethyl ether and after stirring, filtration was carried out and the obtained filtrated product was dried to obtain Electrolyte 1 in which a sulfonic acid group(s) was/were introduced into P-1.

Example 2: Synthesis of Electrolyte 2

(1) Synthesis of P-2

[Formula 26]

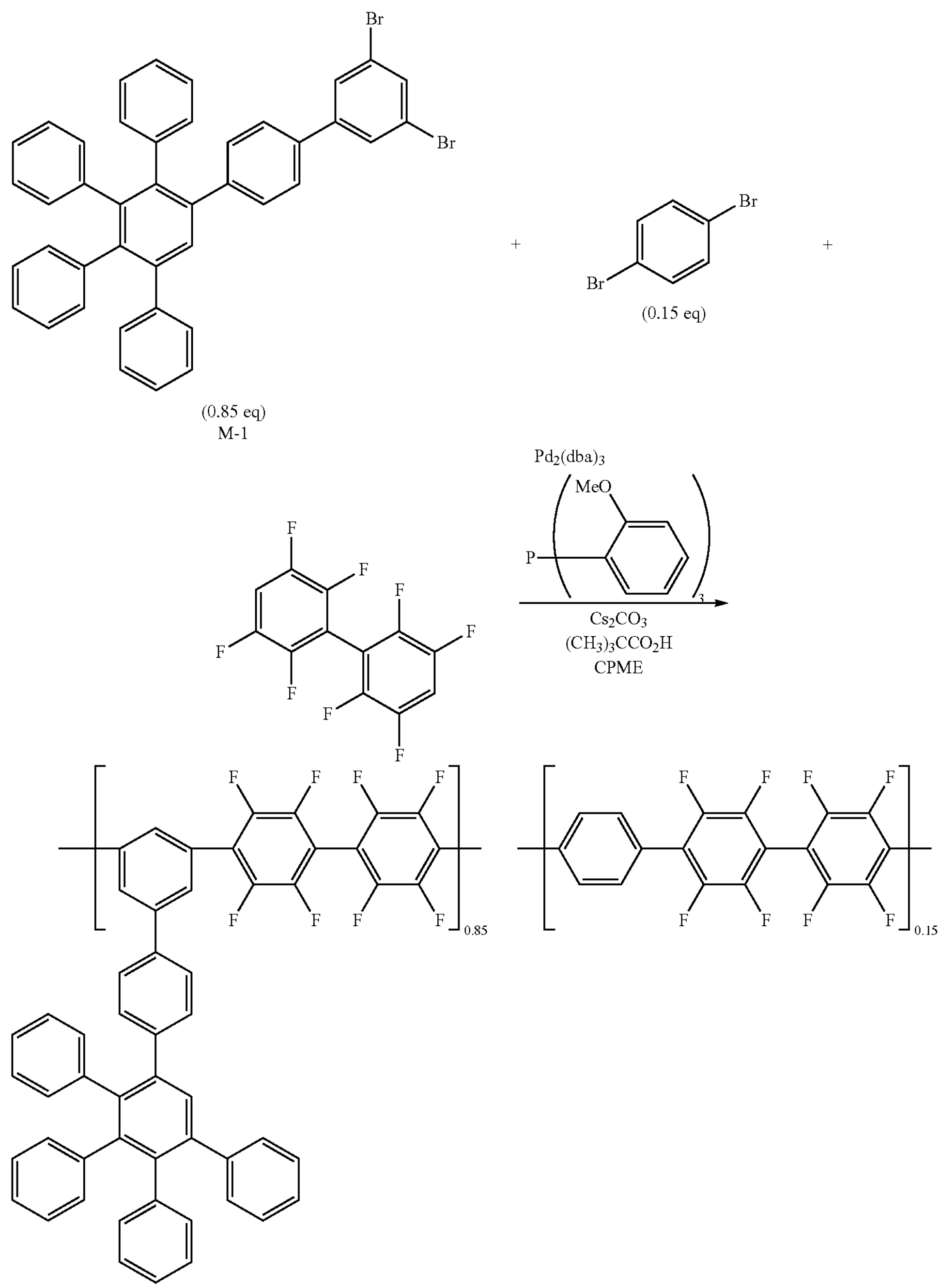

(0.85 eq)
M-1

(0.15 eq)

P-2

Under nitrogen atmosphere, in a reaction apparatus were charged 0.59 g of M-1, 0.036 g of 1,4-dibromobenzene, 0.30 g of 2,2',3,3',5,5',6,6'-octafluorobiphenyl, 0.0094 g of tris(dibenzylideneacetone)dipalladium, 0.014 g of tris(o-methoxyphenyl)-phosphine, 1.1 g of cesium carbonate and 0.10 g of pivalic acid, and 8 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.3% sodium N,N-diethyldithiocarbamate trihydrate methanol solution and stirred.

Filtration was carried out and the obtained filtrated product was dried to obtain 0.68 g (Yield 89%) of the target P-2.

Mn 32,600 (PDI 2.08)

(2) Synthesis of Electrolyte 2

In a reaction apparatus were charged 0.30 g of P-2 and 15 mL of methylene chloride, and 0.44 g of trimethylsilyl chlorosulfonate was added to the mixture. After the reaction mixture was stirred at room temperature for 14 hours, ethanol was added thereto to stop the reaction. The reaction mixture was added dropwise to diethyl ether and after stirring, filtration was carried out and the obtained filtrated product was dried to obtain 0.32 g of Electrolyte 2 in which a sulfonic acid group(s) was/were introduced into P-2.

Example 3: Synthesis of Electrolyte 3

(1) Synthesis of P-3

[Formula 27]

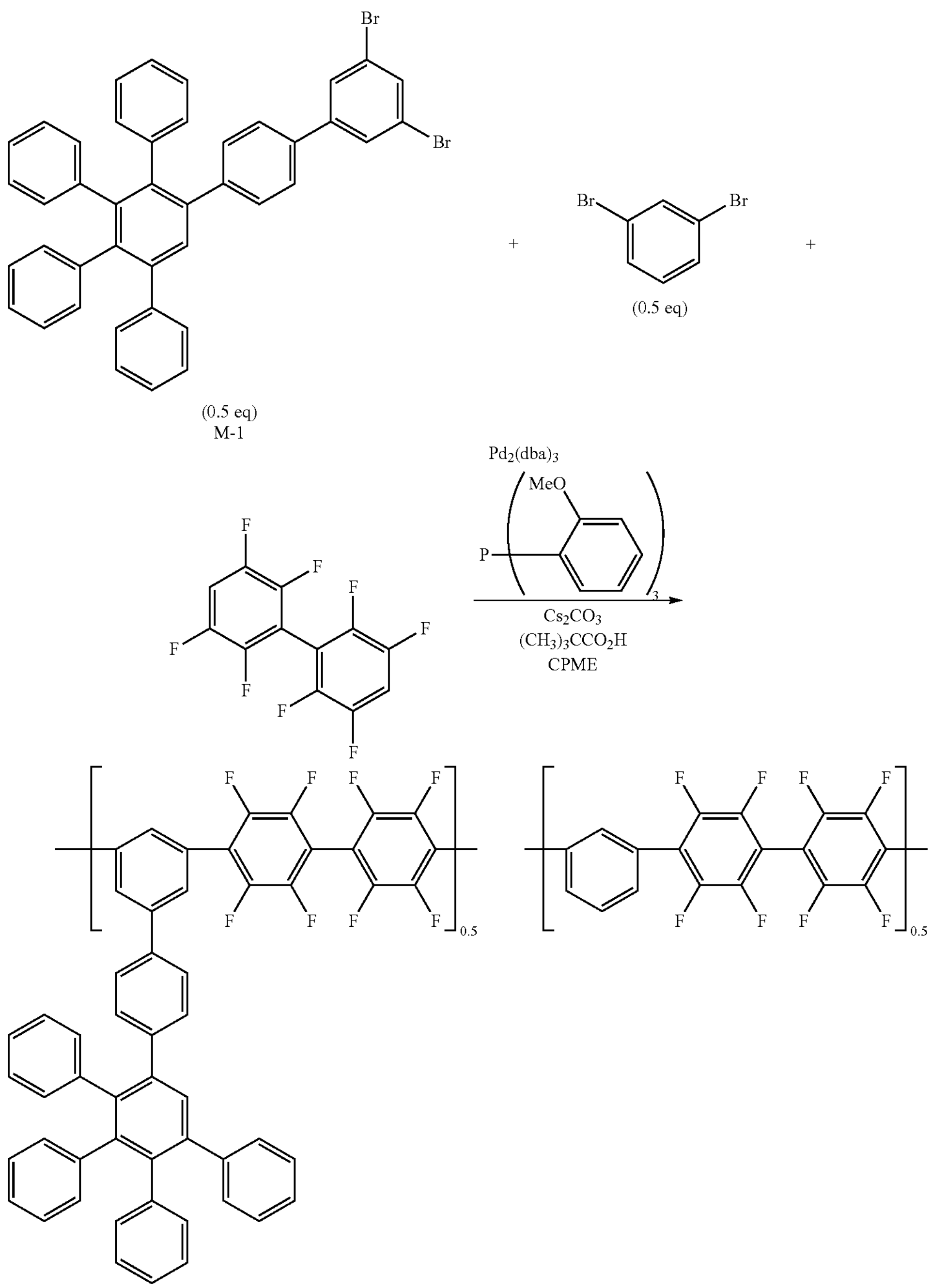

M-1

P-3

Under nitrogen atmosphere, in a reaction apparatus were charged 0.35 g of M-1, 0.12 g of 1,3-dibromobenzene, 0.30 g of 2,2',3,3',5,5',6,6'-octafluorobiphenyl, 0.0096 g of tris(dibenzylideneacetone)dipalladium, 0.015 g of tris(o-methoxy-phenyl)phosphine, 1.1 g of cesium carbonate and 0.10 g of pivalic acid, and 9 mL of cyclopentyl methyl ether was added to the mixture. The reaction mixture was heated to 105° C. and stirred for 22 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.4% sodium N,N-diethyldithiocarbamate trihydrate methanol solution and stirred. Filtration was carried out and the obtained filtrated product was dried to obtain 0.32 g (Yield 52%) of the target P-3.

Mn 21,600 (PDI 2.33)

(2) Synthesis of Electrolyte 3

In a reaction apparatus were charged 0.30 g of P-3 and 15 mL of methylene chloride, and 0.57 g of trimethylsilyl chlorosulfonate was added to the mixture. After the reaction mixture was stirred at room temperature for 19 hours, ethanol was added thereto to stop the reaction. The reaction mixture was added dropwise to diethyl ether and after stirring, filtration was carried out and the obtained filtrated product was dried to obtain 0.27 g of Electrolyte 3 in which a sulfonic acid group(s) was/were introduced into P-3.

Example 4: Synthesis of Electrolyte 4

(1) Synthesis of P-4

[Formula 28]

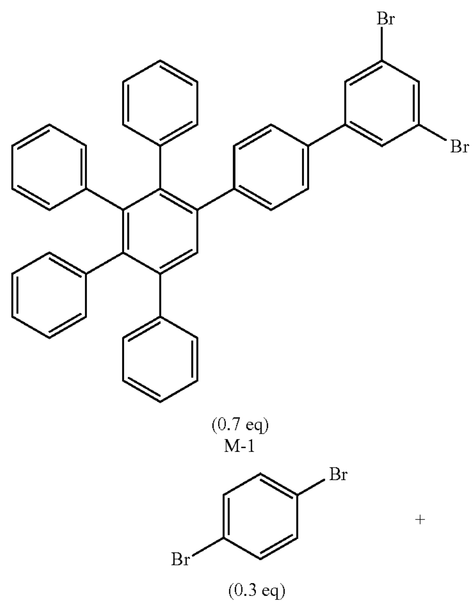

(0.7 eq)
M-1

(0.3 eq)

-continued

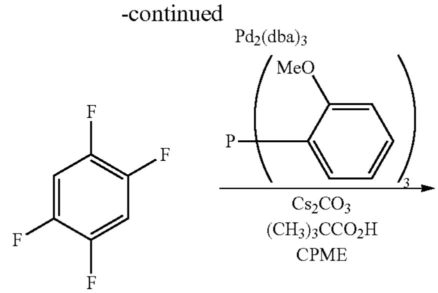

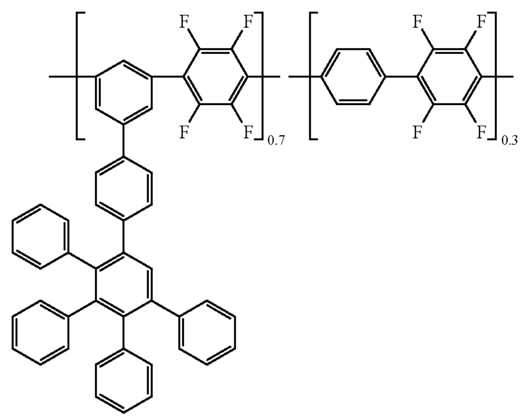

P-4

Under nitrogen atmosphere, in a reaction apparatus were charged 0.49 g of M-1, 0.071 g of 1,4-dibromobenzene, 0.15 g of 1,2,4,5-tetrafluorobenzene, 0.0093 g of tris(dibenzylideneacetone)dipalladium, 0.014 g of tris(o-methoxyphenyl) phosphine, 1.1 g of cesium carbonate and 0.10 g of pivalic acid, and 9 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.3% sodium N,N-diethyldithiocarbamate trihydrate methanol solution and stirred. Filtration was carried out and the obtained filtrated product was dried to obtain 0.50 g (Yield 92%) of the target P-4.

Mn 20,300 (PDI 1.80)

(2) Synthesis of Electrolyte 4

In a reaction apparatus were charged 0.30 g of P-4 and 15 mL of methylene chloride, and 0.61 g of trimethylsilyl chlorosulfonate was added to the mixture. After the reaction mixture was stirred at room temperature for 15 hours, ethanol was added thereto to stop the reaction. The reaction mixture was added dropwise to diethyl ether and after stirring, filtration was carried out and the obtained filtrated product was dried to obtain 0.39 g of Electrolyte 4 in which a sulfonic acid group(s) was/were introduced into P-4.

Example 5: Synthesis of Electrolyte 5

(1) Synthesis of P-5

[Formula 29]

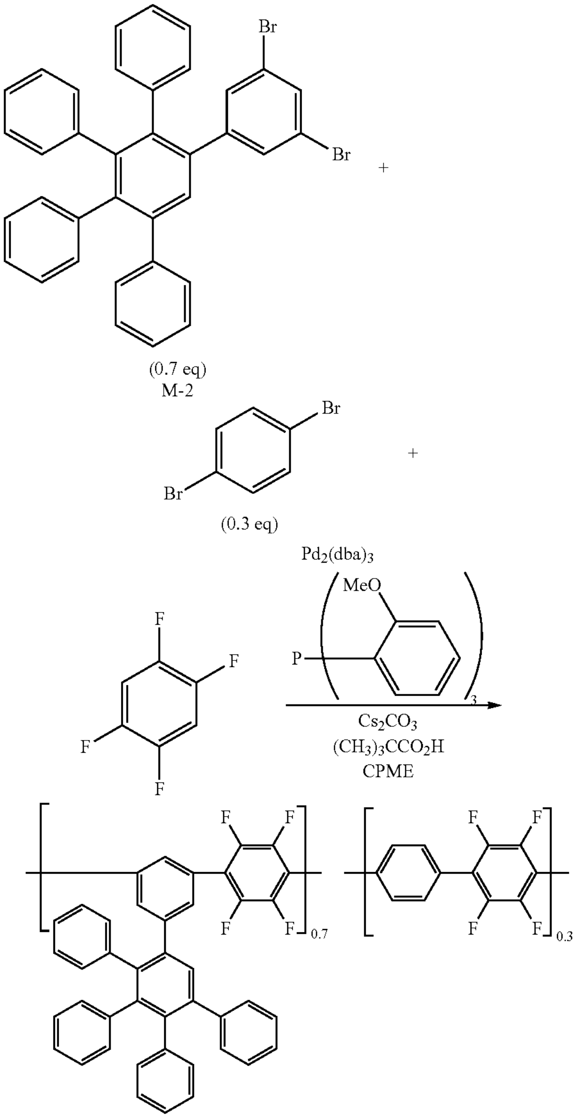

P-5

Under nitrogen atmosphere, in a reaction apparatus were charged 0.50 g of M-2, 0.083 g of 1,4-dibromobenzene, 0.17 g of 1,2,4,5-tetrafluorobenzene, 0.011 g of tris(dibenzylideneacetone)dipalladium, 0.016 g of tris(o-methoxyphenyl) phosphine, 1.2 g of cesium carbonate and 0.12 g of pivalic acid, and 9 mL of cyclopentyl methyl ether was added to the mixture. The reaction mixture was heated to 105° C. and stirred for 21.5 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.3% sodium N,N-diethyldithiocarbamate trihydrate methanol solution and stirred. Filtration was carried out and the obtained filtrated product was dried to obtain 0.50 g (Yield 89%) of the target P-5.

Mn 23,700 (PDI 2.43)

(2) Synthesis of Electrolyte 5

In a reaction apparatus were charged 0.30 g of P-5 and 15 mL of methylene chloride, 0.66 g of trimethylsilyl chlorosulfonate was added to the mixture. After the reaction mixture was stirred at room temperature for 13 hours, ethanol was added thereto to stop the reaction. The reaction mixture was added dropwise to diethyl ether and after stirring, filtration was carried out and the obtained filtrated product was dried to obtain 0.26 g of Electrolyte 5 in which a sulfonic acid group(s) was/were introduced into P-5.

Example 6: Synthesis of Electrolyte 6

(1) Synthesis of P-6

[Formula 30]

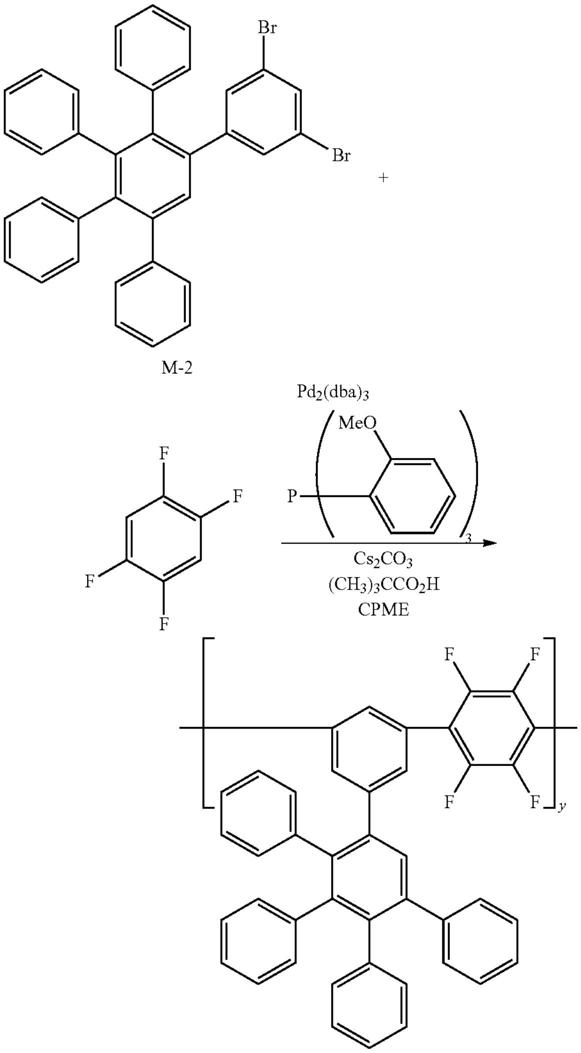

P-6

Under nitrogen atmosphere, in a reaction apparatus were charged 0.50 g of M-2, 0.12 g of 1,2,4,5-tetrafluorobenzene, 0.0074 g of tris(dibenzylideneacetone)-dipalladium, 0.012 g of tris(o-methoxyphenyl)phosphine, 0.87 g of cesium carbonate and 0.084 g of pivalic acid, and 9 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.2% sodium N,N-diethyldithiocarbamate trihydrate methanol solution and stirred. Filtration was carried out and the obtained filtrated product was dried to obtain 0.44 g (Yield 90%) of the target P-6.

Mn 8,400 (PDI 1.56)

(2) Synthesis of Electrolyte 6

In a reaction apparatus were charged 0.31 g of P-6 and 15 mL of methylene chloride, and 0.55 g of trimethylsilyl chlorosulfonate was added to the mixture. After the reaction mixture was stirred at room temperature for 12.5 hours, ethanol was added thereto to stop the reaction. The reaction mixture was added dropwise to diethyl ether and after stirring, filtration was carried out and the obtained filtrated product was dried to obtain 0.34 g of Electrolyte 6 in which a sulfonic acid group(s) was/were introduced into P-6.

Example 7: Synthesis of Electrolyte 7

(1) Synthesis of P-7

[Formula 31]

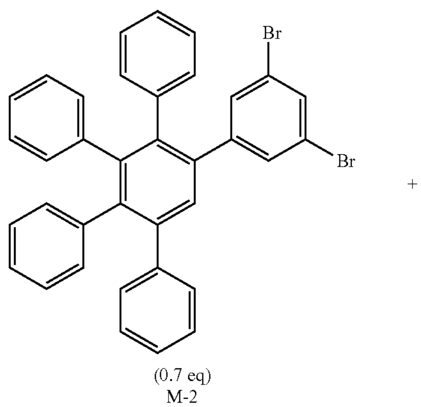

(0.7 eq)
M-2

+

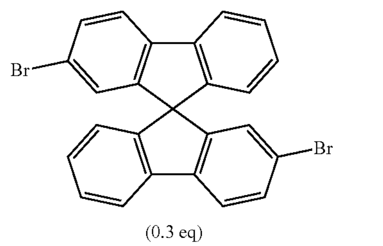

(0.3 eq)

+

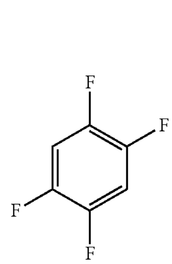

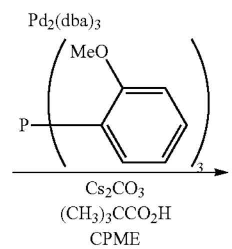

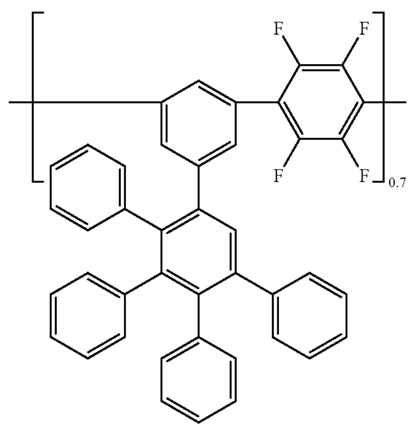

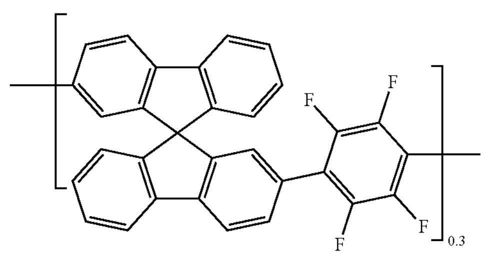

P-7

Under nitrogen atmosphere, in a reaction apparatus were charged 0.50 g of M-2, 0.16 g of 2,2-dibromo-9,9'-spirobi [9H-fluorene], 0.17 g of 1,2,4,5-tetrafluoro-benzene, 0.011 g of tris(dibenzylideneacetone)dipalladium, 0.016 g of tris(o-methoxy-phenyl)phosphine, 1.2 g of cesium carbonate and 0.12 g of pivalic acid, and 9 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.5% sodium N,N-diethyldithiocarbamate trihydrate methanol solution and stirred. Filtration was carried out and the obtained filtrated product was dried to obtain 0.54 g (Yield 84%) of the target P-7.

Mn 20,400 (PDI 2.25)

(2) Synthesis of Electrolyte 7

In a reaction apparatus were charged 0.30 g of P-7 and 15 mL of methylene chloride, and 0.57 g of trimethylsilyl chlorosulfonate was added to the mixture. After the reaction mixture was stirred at room temperature for 13.5 hours, ethanol was added thereto to stop the reaction. The reaction mixture was added dropwise to diethyl ether and after stirring, filtration was carried out and the obtained filtrated product was dried to obtain 0.30 g of Electrolyte 7 in which a sulfonic acid group(s) was/were introduced into P-7.

Example 8: Synthesis of Electrolyte 8

(1) Synthesis of P-8

[Formula 32]

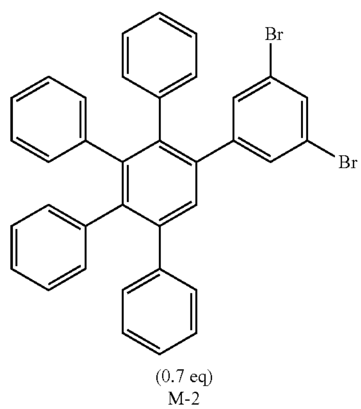

(0.7 eq)
M-2

+

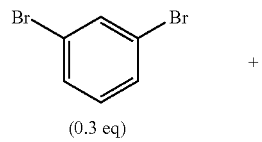

(0.3 eq)

+

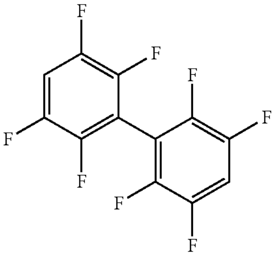

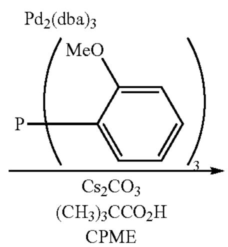

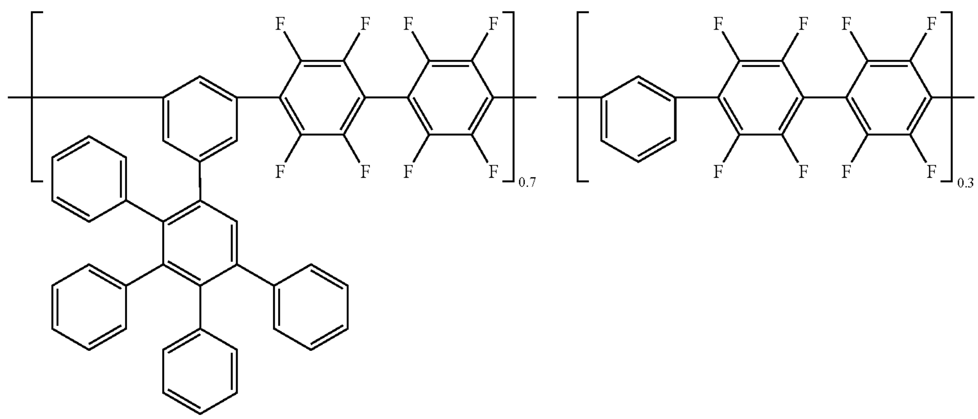

P-8

Under nitrogen atmosphere, in a reaction apparatus were charged 0.58 g of M-2, 0.097 g of 1,3-dibromobenzene, 0.40 g of 2,2',3,3',5,5',6,6'-octafluorobiphenyl, 0.013 g of tris(dibenzylideneacetone)dipalladium, 0.019 g of tris(o-methoxyphenyl)-phosphine, 1.4 g of cesium carbonate and 0.14 g of pivalic acid, and 10 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 1.0% sodium N,N-diethyldithiocarbamate trihydrate methanol solution and stirred. Filtration was carried out and the obtained filtrated product was dried to obtain 0.72 g (Yield 85%) of the target P-8.

Mn 18,200 (PDI 2.12)

(2) Synthesis of Electrolyte 8

In a reaction apparatus were charged 0.30 g of P-8 and 15 mL of methylene chloride, and 0.51 g of trimethylsilyl chlorosulfonate was added to the mixture. After the reaction mixture was stirred at room temperature for 14 hours, ethanol was added thereto to stop the reaction. The reaction mixture was added dropwise to diethyl ether and after stirring, filtration was carried out and the obtained filtrated product was dried to obtain 0.14 g of Electrolyte 8 in which a sulfonic acid group(s) was/were introduced into P-8.

Comparative Example 1: Synthesis of Electrolyte 9

(1) Synthesis of P-9

[Formula 33]

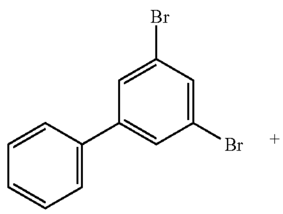

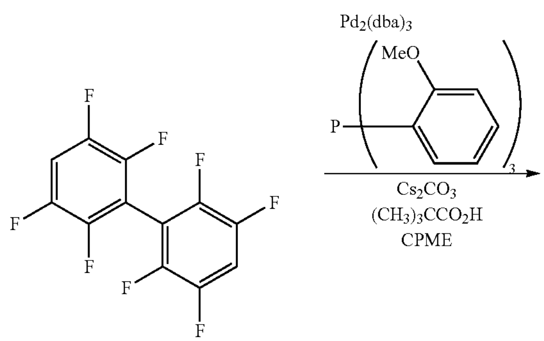

-continued

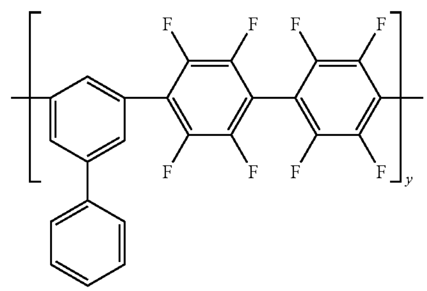

P-9

Under nitrogen atmosphere, in a reaction apparatus were charged 0.32 g of 3,5-dibromobiphenyl, 0.30 g of 2,2',3,3',5,5',6,6'-octafluorobiphenyl, 0.0098 g of tris(dibenzylideneacetone) dipalladium, 0.014 g of tris(o-methoxyphenyl) phosphine, 1.1 g of cesium carbonate and 0.10 g of pivalic acid, and 6 mL of cyclopentyl methyl ether was added to the mixture. The reaction mixture was heated to 105° C. and stirred for 23.5 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.3% sodium N,N-diethyldithiocarbamate trihydrate methanol solution and stirred. Filtration was carried out and the obtained filtrated product was dried to obtain 0.36 g (Yield 80%) of the target P-9.

Mn 25,200 (PDI 2.36)

(2) Synthesis of Electrolyte 9

In a reaction apparatus were charged 0.30 g of P-9 and 15 mL of methylene chloride, and 0.37 g of trimethylsilyl chlorosulfonate was added to the mixture. After the reaction mixture was stirred at room temperature for 23 hours, ethanol was added thereto to stop the reaction. The reaction mixture was added dropwise to diethyl ether and after stirring, filtration was carried out and the obtained filtrated product was dried to obtain 0.30 g of Electrolyte 9 in which a sulfonic acid group(s) was/were introduced into P-9.

Comparative Example 2: Synthesis of P-10

[Formula 34]

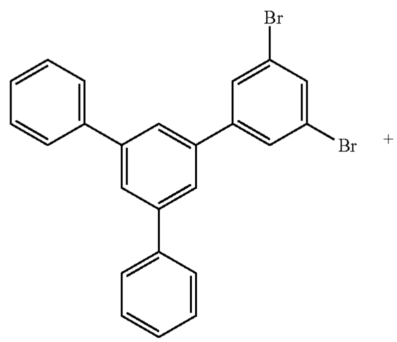

-continued

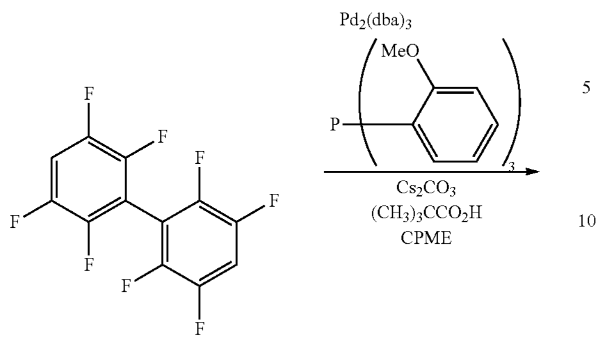

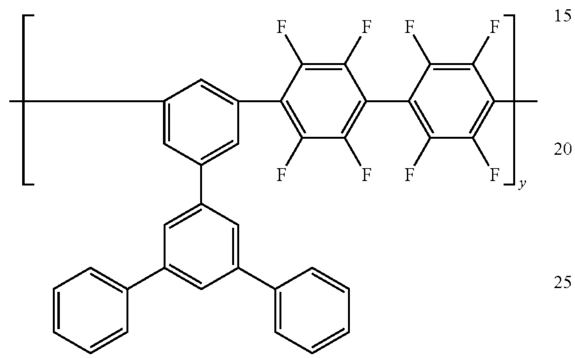

P-10

Under nitrogen atmosphere, in a reaction apparatus were charged 0.47 g of 3,5-dibromo-5'-phenyl-1,1':3',1"-terphenyl, 0.30 g of 2,2',3,3',5,5',6,6'-octafluoro-biphenyl, 0.0091 g of tris(dibenzylideneacetone)dipalladium, 0.014 g of tris(o-methoxy-phenyl)phosphine, 1.1 g of cesium carbonate and 0.10 g of pivalic acid, and 6 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out and the obtained filtrated product was dried to obtain the target P-10. Incidentally, the obtained P-10 had low solubility so that molecular weight measurement could not be done.

Comparative Example 3: Synthesis of P-11

[Formula 35]

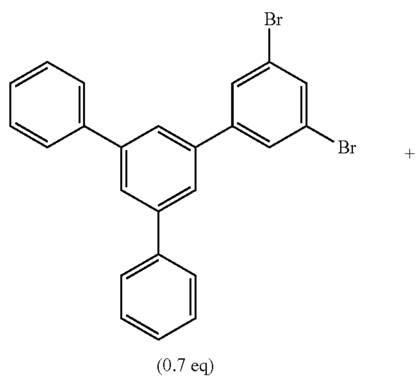

(0.7 eq)

+

-continued

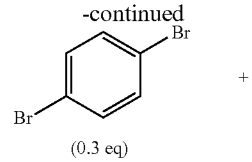

(0.3 eq)

+

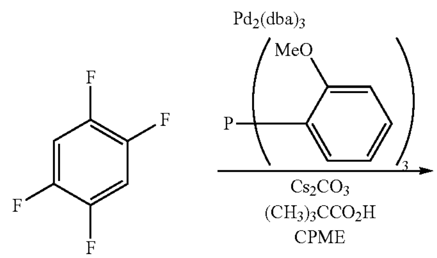

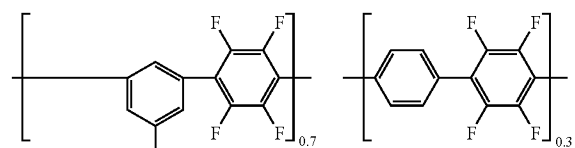

P-11

Under nitrogen atmosphere, in a reaction apparatus were charged 0.74 g of 3,5-dibromo-5'phenyl-1,1':3',1"-terphenyl, 0.16 g of 1,4-dibromobenzene, 0.35 g of 1,2,4,5-tetrafluorobenzene, 0.021 g of tris(dibenzylideneacetone)dipalladium, 0.032 g of tris(o-methoxyphenyl)phosphine, 2.4 g of cesium carbonate and 0.23 g of pivalic acid, and 5 mL of cyclopentyl methyl ether was added to the mixture. The reaction mixture was heated to 105° C. and stirred for 24 hours. After cooling to room temperature, the reaction mixture was added dropwise to a methanol-deionized water mixed solution and stirred. Filtration was carried out and the obtained filtrated product was dried to obtain the target P-11. Incidentally, the obtained P-11 had low solubility so that molecular weight measurement could not be done.

Comparative Example 4: Synthesis of Electrolyte 10

(1) Synthesis of P-12

[Formula 36]

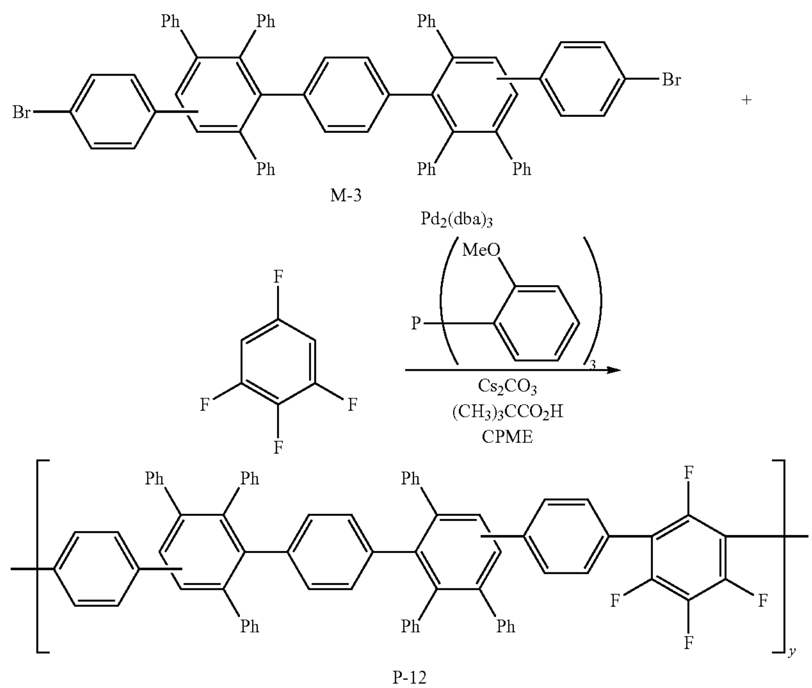

M-3

P-12

Under nitrogen atmosphere, in a reaction apparatus were charged 1.50 g of M-3, 0.27 g of 1,2,3,5-tetrafluorobenzene, 0.014 g of tris(dibenzylideneacetone)-dipalladium, 0.022 g of tris(o-methoxyphenyl)phosphine, 1.62 g of cesium carbonate and 0.16 g of pivalic acid, and 17 mL of cyclopentyl methyl ether was added to the mixture. The reaction mixture was heated to 105° C. and stirred for 19 hours. After cooling to room temperature, the reaction mixture was added dropwise to a methanol-deionized water mixed solution and stirred. Filtration was carried out, and after the obtained filtrated product was dried and dissolved in tetrahydrofuran, the solution was added dropwise to a 0.2% sodium N,N-diethyldithiocarbamate trihydrate methanol solution and stirred. Filtration was carried out and the obtained filtrated product was dried to obtain 1.26 g (Yield 85%) of the target P-12.

Mn 10,100 (PDI 1.90)

(2) Synthesis of Electrolyte 10

In a reaction apparatus were charged 0.30 g of P-12 and 15 mL of methylene chloride, and 1.66 g of trimethylsilyl chlorosulfonate was added to the mixture. After the reaction mixture was stirred at room temperature for 15.5 hours, ethanol was added thereto to stop the reaction. The reaction mixture was added dropwise to diethyl ether and after stirring, filtration was carried out and the obtained filtrated product was dried to obtain 0.39 g of Electrolyte 10 in which a sulfonic acid group(s) was/were introduced into P-12.

[Confirmation of Solubility of Polymers P-1 to P-12 Before Introduction of Sulfonic Acid Group]

In order to confirm solubility in the solvent used for the reaction of introducing the sulfonic acid group, a polymer was each added to the chloroform solvent in an amount to give a solution of 0.25% by mass, and was evaluated in accordance with the following criteria.

○: There was no undissolved polymer and a solution of 0.25% by mass was able to be prepared.

x: There was undissolved polymer and a solution of 0.25% by mass was not able to be prepared.

The results are shown in Table 1.

[Confirmation of Solubility of Electrolytes 1 to 10]

In order to confirm the solubility in the polar solvent used as the solvent for the catalyst ink, an electrolyte was added to a 1-propanol/deionized water (1 part by mass/1 part by mass) mixed solvent in an amount to give a solution of 5% by mass, and was evaluated in accordance with the following criteria. The results are shown in Table 1.

○: There was no undissolved electrolyte and a solution of 5% by mass was able to be prepared.

x: There was undissolved electrolyte and a solution of 5% by mass was not able to be prepared.

[Preparation of Catalyst Ink]

Into a glass container were added 0.25 g of platinum-carried carbon catalyst (TEC10E50E, manufactured by Tanaka Kikinzoku Kogyo), 4.5 g of deionized water, 4.5 g of 1-propanol and 1.3 g of 5% water/1-propanol (1 part by mass/1 part by mass) solution of the electrolyte synthesized in Examples 1 to 8 and Comparative Example 1, and subjected to ultrasonic irradiation for 20 minutes using a homogenizer to prepare a catalyst ink.

[Preparation of Gas Diffusion Electrode]

A gas diffusion layer attached with a microporous layer (SIGRACET GDL28BC, manufactured by SGL carbon) was placed on a hot plate at 80° C., and the catalyst ink prepared by the above-mentioned method was coated on the microporous layer side by spray method to prepare a gas diffusion electrode in which a catalyst layer was formed on the microporous layer.

[Preparation of Membrane-Electrode Assembly]

Both sides of the electrolyte membrane (Nafion NR212, film thickness 50 μm, manufactured by Chemours) was sandwiched by a pair of the gas diffusion electrodes prepared as mentioned above, and hot press molding was carried out for 10 minutes under the conditions of 0.47 kN and 140° C. to prepare a membrane-electrode assembly.

[Evaluation of Power Generation]

The portion other than the electrode portion of the membrane-electrode assembly obtained above was covered by a pair of gaskets, and on both sides, a separator that also serves as a gas flow path, a current collector plate, an insulating sheet, and a clamping plate are arranged to prepare a polymer electrolyte fuel cell. Using this as a single cell, one side was used as an oxygen electrode and air was supplied, and the other side was used as a fuel electrode and hydrogen was supplied to generate power. As the power generation conditions, cell temperature was 80° C., relative humidities at the air side and the fuel side were both 50% RH, and each gas was supplied so that utilization rates of the fuel and oxygen became 2%, and evaluation of power generation performance was carried out. Output voltages at 0.8, 0.6 and 0.4 A/$cm^2$ are shown in Table 1.

TABLE 1

| | | Solubility of polymer before introducing sulfonic acid group(s) | | Solubility of electrolyte after introducing sulfonic acid group(s) | Cell voltage at each current density at 50% RH | | |
|---|---|---|---|---|---|---|---|
| | | | | | 0.8 A/$cm^2$ | 0.6 A/$cm^2$ | 0.4 A/$cm^2$ |
| Example 1 | P1 | ○ | Electrolyte 1 | ○ | 0.36 | 0.43 | 0.51 |
| Example 2 | P2 | ○ | Electrolyte 2 | ○ | 0.42 | 0.49 | 0.56 |
| Example 3 | P3 | ○ | Electrolyte 3 | ○ | 0.39 | 0.46 | 0.54 |
| Example 4 | P4 | ○ | Electrolyte 4 | ○ | 0.43 | 0.51 | 0.58 |
| Example 5 | P5 | ○ | Electrolyte 5 | ○ | 0.40 | 0.47 | 0.55 |
| Example 6 | P6 | ○ | Electrolyte 6 | ○ | 0.41 | 0.48 | 0.54 |
| Example 7 | P7 | ○ | Electrolyte 7 | ○ | 0.44 | 0.51 | 0.58 |
| Example 8 | P8 | ○ | Electrolyte 8 | ○ | 0.33 | 0.41 | 0.49 |
| Comparative Example 1 | P9 | ○ | Electrolyte 9 | X | | | |
| Comparative Example 2 | P10 | X | | | | | |
| Comparative Example 3 | P11 | X | | | | | |
| Comparative Example 4 | P12 | ○ | Electrolyte 10 | ○ | 0.32 | 0.39 | 0.47 |

As shown in Table 1, Examples 1 to 8 have high solubility in polar solvents as compared with those of Comparative Examples 1 to 4, and they were possible to generate electricity with a cell so that it was confirmed that they could be used as an electrolyte.

EXPLANATION OF REFERENCE NUMERALS

100 Polymer electrolyte fuel cell
101 Gas diffusion layer
103 Anode catalyst layer
105 Cathode catalyst layer
107 Polymer electrolyte membrane
109 Separator

The invention claimed is:

1. A compound having a structure represented by the following general formula (I)

(I)

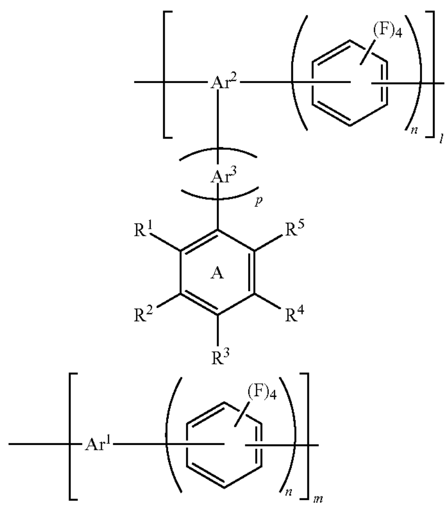

wherein in the general formula (I), $Ar^1$ is an aromatic structure optionally substituted by a sulfonic acid group(s), $Ar^2$ is an aromatic structure optionally substituted by a sulfonic acid group(s), $Ar^3$ is an aromatic structure optionally substituted by a sulfonic acid group(s), provided that when p=1, $Ar^2$ is a benzene ring optionally substituted by a sulfonic acid group(s), $R^1$ to $R^5$ are each independently hydrogen, a sulfonic acid group or an aromatic group, and the aromatic groups are each independently and optionally substituted by a sulfonic acid group(s), one of $R^1$ to $R^5$ is hydrogen or a sulfonic acid group, and four are aromatic groups, one or more of the groups selected from the group consisting of $Ar^1$, $Ar^2$, and $Ar^3$, $R^1$, $R^2$, $R^3$, $R^4$ and $R^5$, when they are aromatic groups, and benzene ring A has one or more sulfonic acid groups, l and m are molar fractions when l+m=1.0, where $0<l\leq 1.0$ and $0\leq m<1.0$, and when m is not 0, each constitutional unit is randomly copolymerized, "n"s are each independently an integer of 1 to 3, and p is 0 or 1.

2. A compound which is obtained by reacting a compound represented by the following general formula (pre-I) with a sulfonating agent (pre-I)

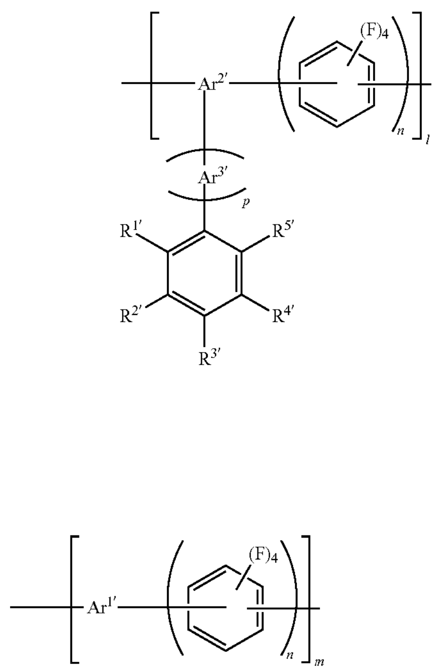

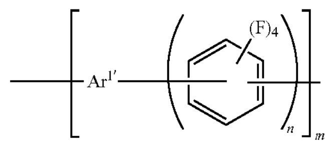

wherein in the general formula (pre-I), $Ar^{1'}$ is an aromatic structure, $Ar^{2'}$ is an aromatic structure, $Ar^{3'}$ is an aromatic structure, provided that when p=1, $Ar^{2'}$ is a benzene ring, $R^{1'}$ to $R^{5'}$ are each independently hydrogen or an aromatic group, one of $R^{1'}$ to $R^{5'}$ is hydrogen, and four are aromatic groups, l and m are molar fractions when l+m=1.0, where $0<l\leq 1.0$ and $0\leq m<1.0$, and when m is not 0, each constitutional unit is randomly copolymerized, "n"s are each independently an integer of 1 to 3, and p is 0 or 1.

3. The compound according to claim 1, wherein, in the general formula (I), $Ar^1$ is one kind selected from the group consisting of

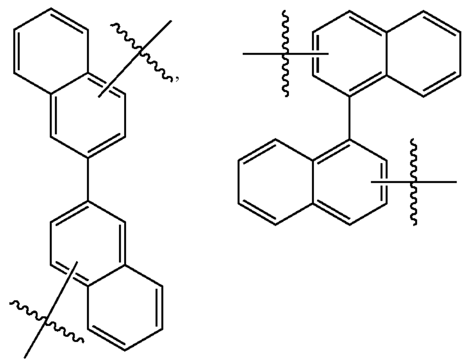

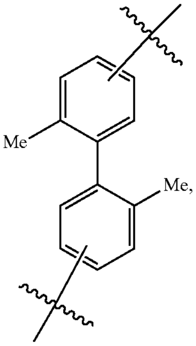

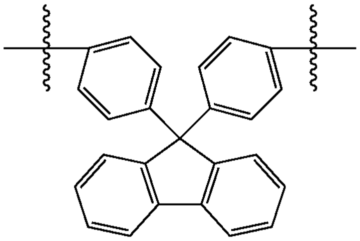

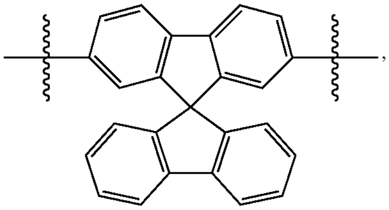

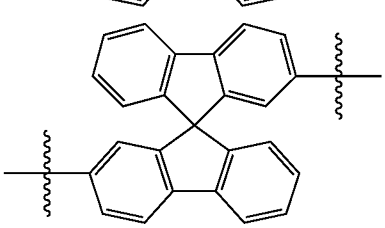

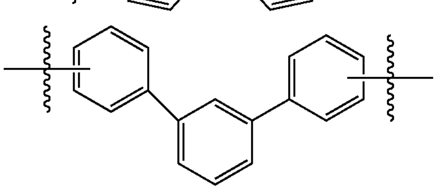

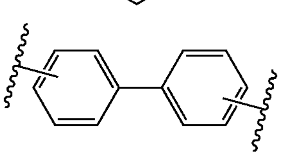

-continued

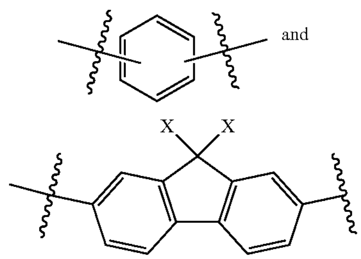

provided that Xs are each independently hydrogen, an alkyl group having 1 to 8 carbon atoms or a phenyl group, and optionally substituted by a sulfonic acid group(s).

4. The compound according to claim 1, wherein, in the general formula (I), $R^1$ to $R^5$ when they are aromatics, are each independently one kind selected from the group consisting of

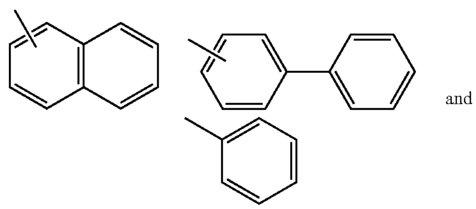

and optionally substituted by a sulfonic acid group(s).

5. The compound according to claim 2, wherein, in the general formula (pre-I), $Ar^{1'}$ is one kind selected from the group consisting of

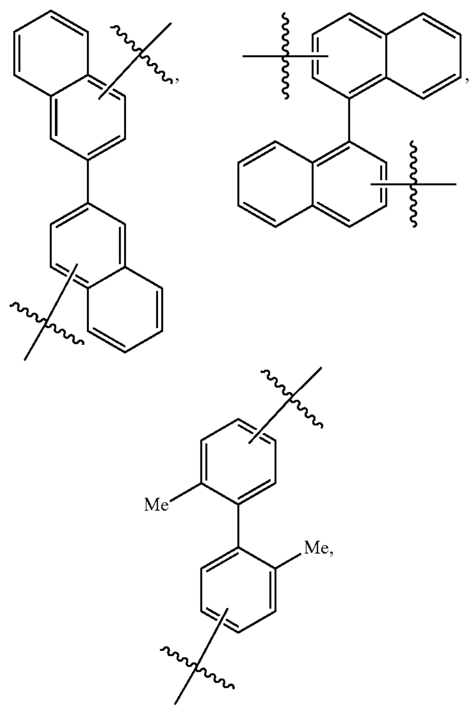

-continued

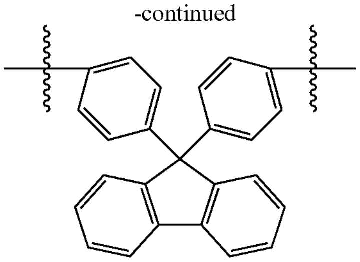

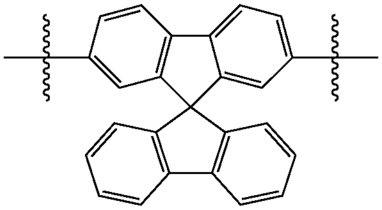

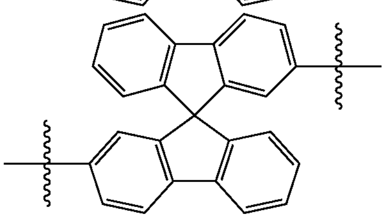

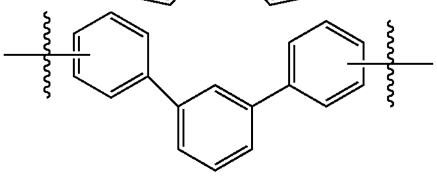

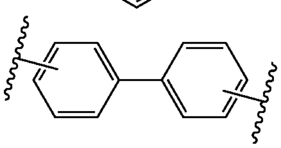

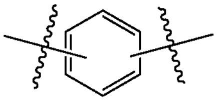

and

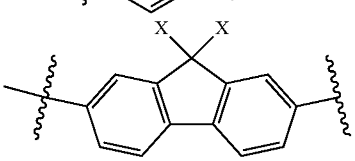

provided that Xs are each independently hydrogen, an alkyl group having 1 to 8 carbon atoms or a phenyl group.

6. The compound according to claim 2, wherein, in the general formula (pre-I), $R^{1'}$ to $R^{5'}$ when they are aromatics, are each independently one kind selected from the group consisting of

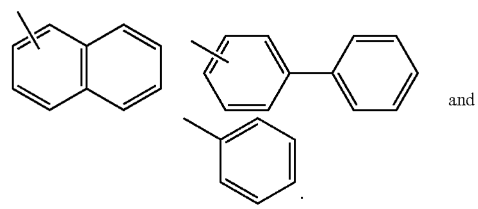

7. The compound according to claim 1, which is used as an electrolyte of an anode catalyst layer and/or a cathode catalyst layer of a polymer electrolyte fuel cell.

8. A catalyst layer of a polymer electrolyte fuel cell which comprises the compound according to claim 1.

9. A catalyst composition which comprises the compound according to claim 1, a metal catalyst and a catalyst carrier.

10. The catalyst composition according to claim 9, which is for a polymer electrolyte fuel cell.

11. A catalyst layer of a polymer electrolyte fuel cell which comprises the catalyst composition according to claim 10.

12. A membrane electrode assembly which comprises a polymer electrolyte membrane, a gas diffusion layer and the catalyst layer according to claim 11.

13. A polymer electrolyte fuel cell which comprises the membrane electrode assembly according to claim 12.

14. The compound according to claim 2, which is used as an electrolyte of an anode catalyst layer and/or a cathode catalyst layer of a polymer electrolyte fuel cell.

15. A method for using the catalyst composition according to of claim 9 for a polymer electrolyte fuel cell.

16. The method according to claim 1, wherein the total number of sulfonic acid groups in the compound of the general formula (I) is 1 to 8.

* * * * *